US010361887B2

(12) United States Patent
Bhatti et al.

(10) Patent No.: US 10,361,887 B2
(45) Date of Patent: Jul. 23, 2019

(54) TIME OF ARRIVAL ESTIMATION

(71) Applicant: Apple Inc., Cupertino, CA (US)

(72) Inventors: Jahshan A. Bhatti, San Jose, CA (US);
Brent M. Ledvina, San Francisco, CA (US); Robert W. Brumley, Cupertino, CA (US); Wei Zhang, Santa Clara, CA (US); Chiu Ngok E. Wong, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/792,671

(22) Filed: Oct. 24, 2017

(65) Prior Publication Data

US 2018/0115439 A1 Apr. 26, 2018

Related U.S. Application Data

(60) Provisional application No. 62/412,780, filed on Oct. 25, 2016.

(51) Int. Cl.
*H04L 25/02* (2006.01)
*H04B 17/30* (2015.01)
(Continued)

(52) U.S. Cl.
CPC ........ *H04L 25/0208* (2013.01); *G01S 5/0215* (2013.01); *G01S 5/0273* (2013.01);
(Continued)

(58) Field of Classification Search
CPC ... H04L 25/0208; H04B 17/30; H04B 17/364; G01S 5/0215; G01S 5/0273; G01S 11/02; G01S 13/765; H04W 84/12
(Continued)

(56) References Cited

U.S. PATENT DOCUMENTS

| 8,345,799 B2* | 1/2013 | Akahori | H04L 25/0212 370/210 |
| 2005/0113142 A1* | 5/2005 | Felter | H04B 1/709 455/562.1 |

(Continued)

FOREIGN PATENT DOCUMENTS

EP 1253437 A2 10/2002

OTHER PUBLICATIONS

Xiong, Jie, "Pushing the Limits of Indoor Localization in Today's Wi-Fi Networks", University College London, Aug. 2015, 127 pgs.
(Continued)

*Primary Examiner* — Danh C Le
(74) *Attorney, Agent, or Firm* — Morgan, Lewis & Bockius LLP

(57) ABSTRACT

The subject system aggregates, or stitches, multiple component channel estimates to generate an aggregated wideband channel estimate that can be used to determine more accurate time of arrival estimations than those determinable from the individual component channel estimates. The subject system also provides for multipath detection on a single channel or an aggregated channel that may be used to facilitate an accurate time of arrival estimation. For example, information derived from the multipath detection may be used to supplement and/or enhance a time of arrival estimation algorithm. The subject system also provides a sounding protocol that allows devices to perform one or more signal exchanges to facilitate generating the aggregated wideband channel estimate and/or to facilitate performing the multipath detection. The protocol allows the devices to perform signal exchanges over one or more channels within a coherence time, and also provides for security mechanisms as well as failure recovery.

20 Claims, 27 Drawing Sheets

(51) Int. Cl.
  *G01S 5/02* (2010.01)
  *G01S 13/76* (2006.01)
  *H04B 17/364* (2015.01)
  *G01S 11/02* (2010.01)
  *H04W 84/12* (2009.01)

(52) U.S. Cl.
  CPC ............ *G01S 11/02* (2013.01); *G01S 13/765* (2013.01); *H04B 17/30* (2015.01); *H04B 17/364* (2015.01); *H04W 84/12* (2013.01)

(58) Field of Classification Search
  USPC .......................... 370/329, 328, 332; 455/450
  See application file for complete search history.

(56) References Cited

U.S. PATENT DOCUMENTS

| | | | | |
|---|---|---|---|---|
| 2010/0014614 A1* | 1/2010 | Leach | ................ | H04B 1/7115 375/340 |
| 2011/0009071 A1* | 1/2011 | Stager | ................ | H04L 25/0204 455/67.16 |
| 2012/0032855 A1 | 2/2012 | Reede et al. | | |
| 2012/0142302 A1* | 6/2012 | Wu | ................ | H03H 17/0664 455/313 |
| 2012/0243597 A1* | 9/2012 | Currivan | ................ | H04L 25/022 375/229 |
| 2012/0250806 A1* | 10/2012 | Zhang | ................ | H04B 1/7107 375/343 |
| 2013/0287153 A1* | 10/2013 | Sahlin | ................ | H04L 25/022 375/346 |
| 2013/0336131 A1 | 12/2013 | Zhang et al. | | |
| 2014/0295877 A1* | 10/2014 | Hart | ................ | H04W 4/02 455/456.1 |
| 2015/0381390 A1* | 12/2015 | Heo | ................ | H04L 25/0232 375/232 |
| 2016/0261319 A1* | 9/2016 | Sanderovich | ................ | H04B 7/0417 |
| 2016/0294581 A1* | 10/2016 | So | ................ | H04L 25/0222 |

OTHER PUBLICATIONS

European Office Action from European Patent Application No. 17198251.5, dated Jul. 12, 2018, 9 pages.
Partial European Search Report from European Patent Application No. 17198251.5, dated Mar. 2, 2018, 15 pages.

* cited by examiner

```
WinLs = LongWindow([length(LongWindow), 1:length(LongWindow)-1]);
WinRs = LongWindow([2:length(LongWindow),1]);
WinM = LongWindow;

checkL = (WinM >= WinLs);
checkR = (WinM >= WinRs);
checkLR =  checkL & checkR;

RawPeakIndex = find(checkLR == 1);
DIF = diff(RawPeakIndex);
RawPeakIndex = RawPeakIndex([1,find(DIF-=1)+1]);
RawPeakEnergy = LongWindow(RawPeakIndex);
```

*FIG. 24*

```
ValidPeakMask = ones(size(SortedPeaks));
ValidPeaks = [];
for k = 1:length(ValidPeakMask)
    if ValidPeakMask(k)
        CurrentPeakLoc = SortedPeakLocations(k);
        CurrentPeak = SortedPeak(k);
        for peakind = 1:size(ValidPeaks,2)
            if abs(CurrentPeakLoc - ValidPeaks(1,peakind)) >= 12 &&
               abs(CurrentPeakLoc - ValidPeaks(1,peakind)) <= 16
                EnergyDiffindB =
10*log10( CurrentPeak/ValidPeaks(2,peakind));
                if EnergyDiffindB < -9
                    ValidPeakMask(k) = 0;
                end
            end
        end
        if ValidPeakMask(k)
            ValidPeaks = [ValidPeaks, [CurrentPeakLoc;CurrentPeak]];
        end
    end
end
```

*FIG. 25*

```
[maxvalue, pmax] = max(LongWindow);
thresh = 10^(-BW/10)* maxvalue;
WindowLen = 3;
rxtxw = LongWindow (winIndex);

while ((rxtxw(1) > thresh) || (rxtxw(end) > thresh)) && (WindowLen < 15)
    WindowLen = WindowLen +1;
    winIndex = (pmax+WindowLen):(-1):(pmax - WindowLen);
    rxtxw = LongWindow (winIndex);
end if (WindowLen < 15)
    for k = (WindowLen+1):(-1):2
        if sign((rxtxw(k)-thresh)*(rxtxw(k-1)-thresh)) <=0
            d0 = thresh - rxtxw (k-1);
            d1 = rxtxw(k)-rxtxw(k-1);
            CrP1 = floor(((k-1) * d1 + d0) * 2^resshift /d1);
        end
    end for k = (WindowLen+1) : (1) :2*WindowLen
        if sign((rxtxw(k)-thresh)*(rxtxw(k+1)-thresh)) <=0
            d0 = thresh - rxtxw(k+1);
            d1 = rxtxw(k)-rxtxw(k+1);
            CrP2 = ceil(((k+1) * d1 - d0) * 2^resshift /d1);
        end
    end
    BWinSample = (CrP2 - CrP1)/2^resshift;
else
    BWinSample = 40;% Give a particular wrong length so that it can stand out
    fprintf('BW Error!: Did not find energy lower than thresh within the 30 sample window !\n');
end
```

*FIG. 26*

TIME OF ARRIVAL ESTIMATION

CROSS-REFERENCE TO RELATED APPLICATIONS

The present application claims the benefit of U.S. Provisional Patent Application Ser. No. 62/412,780, entitled "Time of Arrival Estimation," filed on Oct. 25, 2016, which is hereby incorporated by reference in its entirety for all purposes.

TECHNICAL FIELD

The present description relates generally to time of arrival estimation, including time of arrival estimation in multipath environments.

BACKGROUND

Ranging applications may be utilized to determine a distance from a location/position of one communication device, such as a mobile device, to a location/position of another communication device, such as a base station, wireless access point, or another mobile device. In some cases, the distance between the communication devices may be determined based on propagation times of wireless signals transmitted by the communication devices, the accuracy of which may be dependent upon accurate time of arrival estimations (of the wireless signals) at the communication devices.

BRIEF DESCRIPTION OF THE DRAWINGS

Certain features of the subject technology are set forth in the appended claims. However, for purpose of explanation, several embodiments of the subject technology are set forth in the following figures.

FIG. 24 illustrates example pseudocode for peak detection in accordance with one or more implementations.

FIG. 25 illustrates example pseudocode for sidelobe rejection in accordance with one or more implementations.

FIG. 26 illustrates example pseudocode for fat-path detection in accordance with one or more implementations.

DETAILED DESCRIPTION

Figure 1:
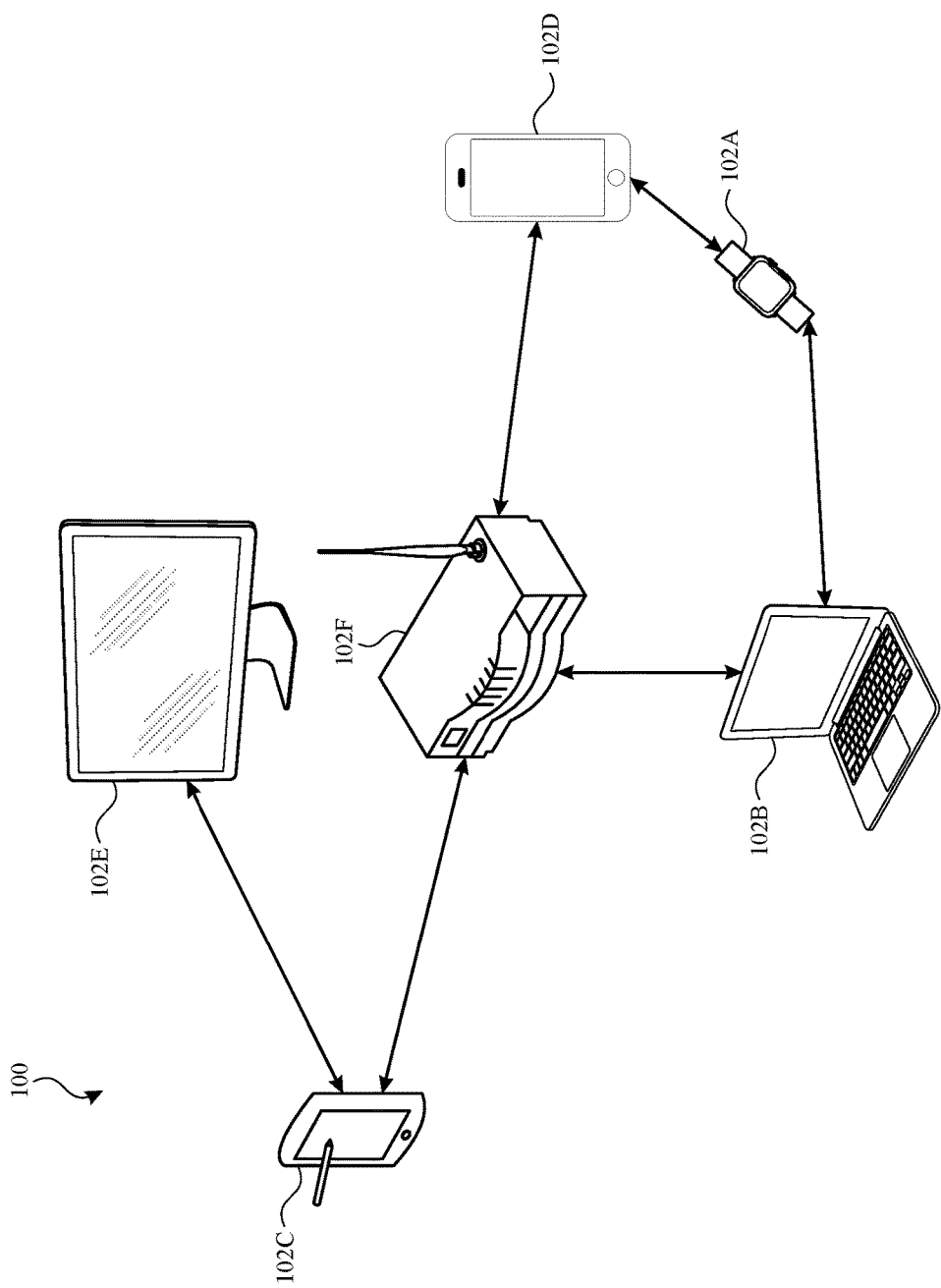
FIG. 1 illustrates an example network environment in which a system for time of arrival estimation may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The accuracy of time of arrival estimations (and/or angle of arrival estimations) performed by an electronic device may be limited by the bandwidth of the communication channel associated with the channel estimate that is used by the electronic device to perform the time of arrival estimation. The accuracy may also be impacted by the widened channel impulse response of multipath communication channels encountered in certain wireless environments, such as indoors. The subject system provides a solution to these and other problems by aggregating, or stitching, multiple component channel estimates to generate an aggregated wideband channel estimate that can be used by the electronic device to determine more accurate time of arrival estimations than those determinable from the individual component channel estimates.

The subject system also provides for multipath detection on a single channel or an aggregated channel that may be used to facilitate an accurate time of arrival estimation (and/or angle of arrival estimation). For example, information derived from the multipath detection may be used to supplement and/or enhance existing time of arrival estimation algorithms. Furthermore, the multipath detection may be used to adaptively select an appropriate time of arrival estimation algorithm based on whether multiple paths were detected. For example, if multiple signal paths are detected, then a time of arrival estimation algorithm that tolerates multipath environments may be utilized, such as multiple signal classification (MUSIC), estimation of signal parameters bias rotational invariance techniques (ESPRIT), and the like. However, if multiple signal paths are not detected, then a lower computational complexity or less resource intensive time of arrival estimation algorithm may be utilized, such as thresholding based on maximum peak energy.

The subject system also provides a protocol, such as a sounding protocol, that allows devices to perform one or more signal exchanges to facilitate generating the aggregated wideband channel estimate and/or to facilitate performing the multipath detection. The protocol allows the devices to perform the signal exchanges over one or more channels within a coherence time associated with the channels and/or wireless environment, and also provides for security mechanisms as well as failure recovery. For example, the devices may collect one or more samples during the signal exchanges, and the samples may then be used to generate the aggregated channel estimate and/or perform the multipath detection.

FIG. 1 illustrates an example network environment 100 in which a system for time of arrival estimation may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-F. The electronic devices 102A-F may be computing devices such as laptop or desktop computers, smartphones, set-top boxes, peripheral devices (e.g., watches, digital cameras, speakers), user input devices, tablets, wireless routers (e.g., Wi-Fi access points), televisions, wearable devices, or other displays with one or more processors coupled thereto and/or embedded therein, or other appropriate devices that include wireless network interfaces, such as wireless local area network (WLAN) radios, Bluetooth radios, and/or other wireless radios.

In FIG. 1, by way of example, the electronic devices 102A, 102B, 102C, 102D, 102E, and 102F are depicted as a smartwatch, a laptop computer, a tablet device, a smartphone, a display device, such as a television, and a wireless router (or access point), respectively. In one or more implementations, the electronic devices 102A-F may be referred to as stations (STAs). One or more of the electronic devices 102A-F may be, and/or may include all or part of, the electronic device discussed below with respect to FIG. 2 and/or the electronic system discussed below with respect to FIG. 27.

One or more of the electronic devices 102A-F may include appropriate wireless network interfaces for establishing direct, e.g. peer-to-peer, wireless network connections, such as Wi-Fi Direct connections, APPLE wireless direct link (AWDL) connections, Bluetooth connections, or generally any wireless network connections that may be used to perform a signal exchange, as well as wireless network connections, such as infrastructure basic service set (BSS) connections, through an intermediary network device, such as the electronic device 102F (wireless router). In FIG. 1, the network environment 100 is illustrated as including various peer-to-peer connections between example pairs of the electronic devices 102A-F. However, the peer-to-peer connections between the electronic devices 102A-F are not limited to the example pairs of electronic devices 102A-F shown in FIG. 1. In one or more implementations, fewer, more, and/or different electronic devices and/or peer-to-peer connections may be utilized in the network environment 100.

In one or more implementations, two or more of the electronic devices 102A-F of the network environment 100, such as the electronic devices 102A-B, may exchange signals with one another to perform one or more ranging operations, such as to determine (or estimate) the distance (e.g., line of sight distance) between the electronic devices 102A-B. The subject system provides the electronic devices 102A-B with a protocol, such as a sounding protocol, that coordinates the signal exchanges and provides for security and failure recovery. The sounding protocol may be one-way and/or two-way, active and/or passive, secured and/or unsecured, and may be performed, for example, via peer-to-peer connections and/or over infrastructure BSS connections. Example signal exchanges of the protocol provided by the subject system are discussed further below with respect to FIGS. 6-14.

The line of sight distance estimation obtained from the one or more ranging operations may be used by one or more of the electronic devices 102A-B, for example, to determine whether to perform one or more tasks. In one or more implementations, the electronic device 102B (laptop computer) may unlock an operating system running on the electronic device 102B when the electronic device 102B estimates (using the subject system) that the electronic device 102A (smartwatch) is within a threshold distance of the electronic device 102B, such as 20 centimeters. In one or more implementations, any of the electronic devices 102A-F may utilize the subject system for indoor positioning, such as by utilizing the electronic device 102F (wireless router) to determine a location/position of one of the electronic devices 102A-E relative to the electronic device 102F, e.g., in an indoor environment.

In one or more implementations, an indoor location of, for example, the electronic device 102B (laptop computer) may be obtained using triangulation by estimating (using the subject system) a distance from two or more static stations, such as the electronic device 102F (wireless router) and another static station, to a dynamic station, such as the electronic device 102B. In one or more implementations, the electronic device 102C (tablet device) may present an option to display content on the electronic device 102E (display device) when the electronic device 102C estimates (using the subject system) that the electronic device 102E is within a threshold distance of the electronic device 102C, such as 3 meters. In one or more implementations, the subject system may facilitate providing a bistatic radar to detect movement, such as for health and/or home intelligence applications, and/or the subject system may facilitate providing a synthetic aperture radar to resolve walls and/or map indoor space.

The line of sight distance estimation between two devices, such as the electronic devices 102A-B, may be determined based on the time of flight for a signal communicated between the electronic devices 102A-B. Time of flight may refer to the time it takes for the signal (e.g., a radio wave carried message) to propagate from the transmitting device, such as the electronic device 102A, to a receiving station, such as the electronic device 102B. The distance between the transmitting station and the receiving station may be utilized for a ranging estimation based on the following relation: distance=c×ToF, where distance is the distance between the transmitting and the receiving station at a point in time, ToF is the time of flight for a signal to propagate between the electronic devices 102A-B, and c is the speed of light ($3 \times 10^8$ m/s).

Thus, the accuracy of the distance estimation between any two of the electronic devices 102A-F, such as the electronic devices 102A-B, may be dependent on an accurate time of flight measurement, which in turn may be dependent on an accurate time of arrival estimation of a signal received by one or more of the electronic devices 102A-B, as is discussed further below with respect to FIG. 3. In one or more implementations, the time of arrival estimation may be determined using a channel estimate of a communication channel utilized by the electronic devices 102A-B, and the accuracy of the time of arrival estimation may be dependent upon the bandwidth of the communication channel.

For example, in one or more wireless environments the accuracy of the time of arrival estimation and the distance estimation may increase as the bandwidth of the channel estimate increases. In one or more implementations, when using a channel estimate to determine the time of arrival estimation, the error margin of the distance estimate between the electronic devices 102A-B may be impacted by the bandwidth and/or signal-to-noise ratio (SNR) associated with the channel estimate. For example, doubling the bandwidth of the channel estimate may reduce one-sigma error by 2.8 (approximately 3) in a multipath-free environment. Furthermore, doubling the SNR may half the on-sigma error. Thus, in one or more wireless environments, the bandwidth of an individual 1 MHz Bluetooth channel, or an individual 20 MHz WLAN channel, may not provide for a channel estimate from which a time of arrival can be estimated with sufficient accuracy to determine whether the electronic device 102A is within the aforementioned threshold distance (e.g., 20 cm) of the electronic device 102B.

In the subject system, the electronic devices 102A-B generate multiple individual component channel estimates for multiple different component channels, such as multiple 1 MHz Bluetooth channels, multiple 20 MHz WLAN channels, multiple 80 MHz WLAN channels, and/or generally any wireless channels, and aggregate the individual component channel estimates to form an aggregated wideband channel estimate having an aggregate bandwidth that exceeds the bandwidth of any of the individual component channel estimates. The individual component channel estimates may be narrowband channel estimates, e.g., relative to the aggregated wideband channel estimate. Any number of component channel estimates may be aggregated into the aggregated wideband channel estimate; however, widening the bandwidth of the aggregated wideband channel estimate, such as by aggregating additional component channel estimates into the aggregated wideband channel estimate, may improve the accuracy of the time of arrival and distance estimations. An example process for generating an aggregated wideband channel estimate from multiple individual component channel estimates is discussed further below with respect to FIG. 4.

In one or more implementations, the component channels used to form the aggregated wideband channel estimate may include, for example, one or more Bluetooth channels (e.g., 1 MHz channels), one or more Wi-Fi channels (e.g., 20, 40, 80, 160 MHz channels), one or more Zigbee channels (e.g., 2 MHz channels), one or more millimeter wave (e.g., 60 Gigahertz (GHz)) channels, or generally any communication channels. Thus, the aggregated wideband channel estimate may be formed from component channels of a single communication protocol or multiple different communication protocols (e.g., Wi-Fi, Bluetooth, Zigbee, etc.). In one or more implementations, two or more of the component channels utilized to form the aggregated wideband channel estimate may be contiguous, overlapping, and/or non-adjacent.

The wider bandwidth associated with the aggregated wideband channel estimate (relative to the bandwidth of the individual component channel estimates) may allow the electronic devices 102A-B to perform time of arrival estimations and, thus, line of sight (or first reflection) distance estimations in any of the component channels with higher accuracy than can be performed from any one of the component channel estimates that form the aggregated wideband channel estimate. For example, the aggregated wideband channel estimate may allow the electronic devices 102A-B to perform time of arrival estimations that are sufficiently accurate to estimate the line of sight distance between the electronic devices 102A-B, such as to determine whether the electronic device 102B is within the aforementioned threshold distance (e.g., 20 cm) of the electronic device 102A. With the higher accuracy associated with the aggregated wideband channel estimate, the subject system can distinguish between the first reflection of a signal and other reflections of the signal, e.g., for a multipath channel, the signal may arrive via one or more non-line of sight paths in addition to a line of sight path.

In one or more implementations, in order to combine the individual component channel estimates to form the aggregated wideband channel estimate, the electronic devices 102A-B may compensate for various operating characteristics and/or other variations that may differ from channel to channel and therefore may impact the individual component channel estimates differently. For example, the clocks of the electronic devices 102A-B may not be synchronized and the electronic devices 102A-B (e.g., components of the electronic devices 102A-B) may be associated with respective internal delays that may differ from channel to channel. The clock offset(s) and the internal delay(s) associated with the electronic devices 102A-B across channels may impact the channel estimates differently and therefore may impact the aggregated wideband channel estimate if not compensated for across the individual component channel estimates.

In the subject system, the clock offset(s) between the electronic devices 102A-B and/or the internal delay(s) associated with the electronic devices 102A-B, may be determined and compensated for by the electronic devices 102A-B across the different channels. Thus, these effects can be compensated for across the different channels such that the effects do not adversely affect an aggregated wideband channel estimate generated by the electronic devices 102A-B, thereby improving the accuracy of the time of arrival estimations determined from the aggregated wideband channel estimate (e.g., relative to a case in which one or more of the effects are not compensated for).

The subject system also provides for multipath detection on a single channel, such as a single 20 MHz WLAN channel. As previously discussed, when multipath signals are present, detecting the first arriving path corresponding to the line of sight distance may be more complex. Thus, the multipath detection may be used to facilitate a selection of an appropriate time of arrival estimation algorithm for a received signal. For example, when multipath signals are detected, a time of arrival estimation algorithm that tolerates the presence of multipath signals, such as MUSIC or ESPRIT (assuming sufficient SNR), may be selected, whereas when multipath signals are not detected a less computationally complex and/or less resource intensive algorithm, such as thresholding based on maximum peak energy, may be selected. In one or more implementations, when multipath signals are detected the subject system may generate the aggregated wideband channel estimate to perform the time of arrival estimation. An example process for multipath detection is discussed further below with respect to FIG. 5.

Figure 2:
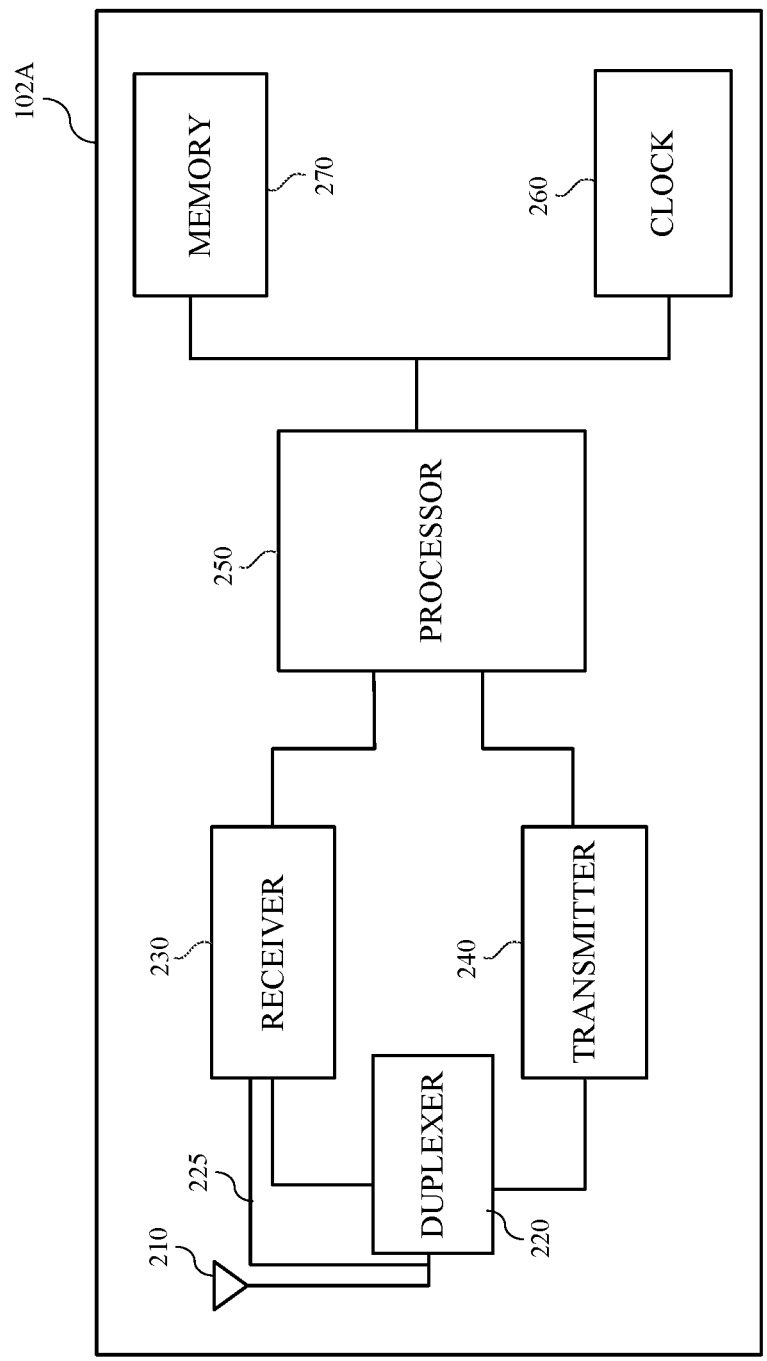
FIG. 2 illustrates an example electronic device that may be utilized in a system for time of arrival estimation in accordance with one or more implementations.

FIG. 2 illustrates an example electronic device 102A that may be utilized in a system for time of arrival estimation in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102A may be implemented by one or more of the other electronic devices 102B-F.

The electronic device 102A includes a radio frequency (RF) antenna 210, a duplexer circuit 220, a loopback path 225, a receiver circuit 230, a transmitter circuit 240, a processing circuit 250, a clock circuit 260, and a memory 270. In one or more implementations, one or more of the components represented in FIG. 2 may be integrated on one or more semiconductor substrates. For example, any/all of the receiver circuit 230, transmitter circuit 240, processing circuit 250, clock circuit 260, and/or memory 270 may be realized in a single chip or a single system on chip, or may be realized in a multi-chip chipset.

The RF antenna 210 may be suitable for transmitting and/or receiving signals (e.g., wireless signals) over a range of frequencies (e.g., 800 MHz, 900 MHz, 1.7 GHz, 2.1 GHz, 2.4 GHz, 2.6 GHz, 5 GHz, 60 GHz, etc.) and/or using dynamic frequency selection (DFS) at 5 GHz and/or other frequencies. Although a single RF antenna 210 is illustrated, additional RF antennas may be utilized. The duplexer circuit 220 may provide isolation in a transmit band to facilitate avoiding saturation of the receiver circuit 230 and/or facilitate avoiding damaging parts of the receiver circuit 230.

The loopback path 225 may be coupled to the transmit path from the transmitter circuit 240 to the antenna 210. The loopback path 225 may pass a radio frequency (RF) signal transmitted by the transmitter circuit 240 back to the receiver circuit 230. Thus, the electronic device 102A may receive a loopback signal corresponding to a signal being transmitted to another electronic device, such as the electronic device 102B. Since the loopback signal is received via the receiver circuit 230 of the electronic device 102A, the loopback signal may be associated with a similar detection delay, and/or other internal delay, as a signal received by the receiver circuit 230 from another electronic device, such as the electronic device 102B. Furthermore, since the loopback signal does not propagate through the network environment 100, the received loopback signal does not include multipath signals. For explanatory purposes, the loopback path 225 is illustrated as being coupled to the transmit path after the duplexer circuit 220; however, the loopback path 225 may be coupled anywhere along the transmit path, such as after the signal has been upconverted to RF. In one or more implementations, the electronic device 102A may not include a loopback path and the loopback signal may pass to the receiver circuit 230 via RF leakage.

The receiver circuit 230 may include suitable logic circuitry and/or code that may be operable to receive and process signals from the RF antenna 210. The receiver circuit 230 may, for example, be operable to amplify and/or down-convert received wireless signals. In some aspects, the receiver circuit 230 may be operable to cancel noise in received signals and/or may be linear over a wide range of frequencies. The receiver circuit 230 may be suitable to allow receipt of signals in accordance with a variety of wireless standards, such as to participate in one or more of the signal exchanges discussed further below with respect to FIGS. 3, 4, and 6-14.

The transmitter circuit 240 may include suitable logic circuitry and/or code that may be operable to process and transmit signals to the RF antenna 210. The transmitter circuit 240 may, for example, be operable to up-convert baseband signals to RF signals and amplify RF signals. The transmitter circuit 240 may be suitable to allow transmission of signals in accordance with a variety of wireless standards, such as to participate in one or more of the signal exchanges discussed further below with respect to FIGS. 3, 4, and 6-14.

In one or more implementations, the processing circuit 250 may be, may include, or may be a part of, a baseband processing circuit or a digital processing circuit. The processing circuit 250 may include suitable logic, circuitry, interfaces, and/or code that may be operable to perform processing of signals, such as baseband signals. The processing circuit 250 may, for example, generate control and/or feedback signals for configuring various components of the electronic device 102A, such as the receiver circuit 230 and the transmitter circuit 240. In this regard, the processing circuit 250 may receive signals from and provide signals to the receiver circuit 230 and the transmitter circuit 240 (e.g., to change channels for purposes of generating multiple individual component channel estimates).

In one or more implementations, the processing circuit 250 may be operable to encode, decode, transcode, modulate, demodulate, encrypt, decrypt, scramble, descramble, and/or otherwise process data in accordance with one or more communication protocols. In one or more implementations, the processing circuit 250 may retrieve (e.g., from the memory 270) and execute instructions to generate component channel estimates, store the generated component channel estimates in the memory 270, aggregate the component channel estimates into an aggregated wideband channel estimate, and generate ranging estimations (e.g., time of arrival estimations, line of sight distance estimations) using the aggregated wideband channel estimate.

The processing circuit 250 may also include suitable logic, circuitry, and/or code that enable processing data and/or controlling operations of the electronic device 102A. In this regard, the processing circuit 250 may be enabled to provide control signals to various other components of the electronic device 102A. The processing circuit 250 may also control transfers of data between various portions of the electronic device 102A. Additionally, the processing circuit 250 may enable implementation of an operating system or otherwise execute code to manage operations of the electronic device 102A.

The clock circuit 260 may include suitable logic, circuitry, interfaces, and/or code that are operable to generate a reference clock signal (e.g., a master clock signal). The reference clock signal may be used to synchronize and schedule operations performed by the various components of the electronic device 102A. The clock circuit 260 may also generate one or more oscillating signals of one or more frequencies, e.g. based on the reference clock signal. The oscillating signals may be referred to as local oscillator (LO) signals. In one or more implementations, the clock circuit 260 may include one or more PLLs to detect and/or compensate for any drift in frequency in the LO signals. In some cases, the same PLL(s) may be used for transmitting and receiving. In other cases, different PLL(s) may be used for transmitting and receiving.

The memory 270 may include suitable logic, circuitry, and/or code that enable storage of various types of information such as received data, sounding parameters, collected samples, generated data, code, and/or configuration information. The memory 270 may include, for example, RAM, ROM, flash, and/or magnetic storage. Information stored in the memory 270 may be utilized for configuring the receiver circuit 230, transmitter circuit 240, processing circuit 250, and/or clock circuit 260. The memory 270 may store instructions retrievable and executable by the processing circuit 250 to facilitate a time of arrival estimation.

In one or more implementations, one or more of the duplexer circuit 220, receiver circuit 230, transmitter circuit 240, processing circuit 250, clock circuit 260, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
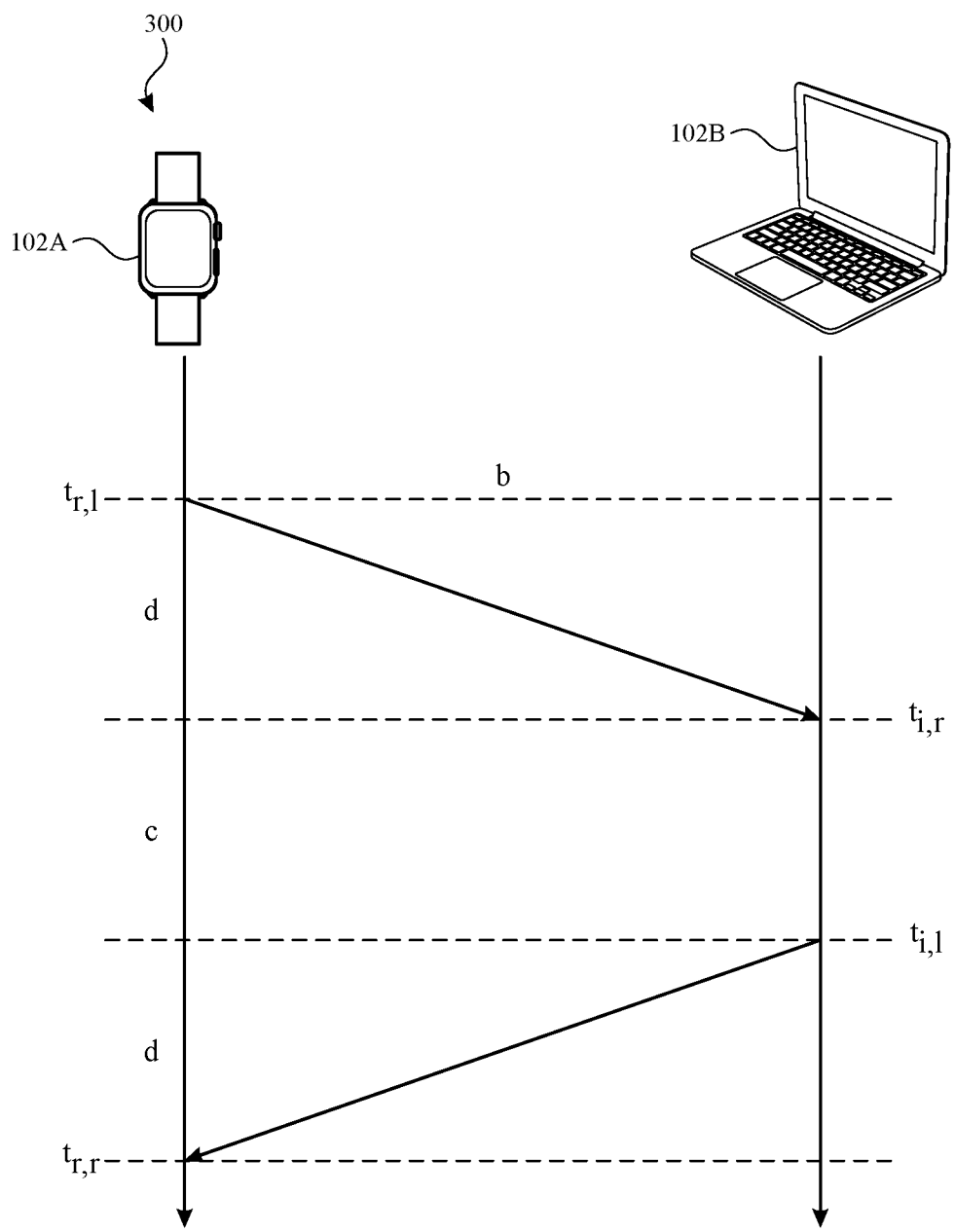
FIG. 3 illustrates a timing diagram of an example signal exchange between two electronic devices to generate a channel estimate for a given channel in accordance with one or more implementations.

FIG. 3 illustrates a timing diagram 300 of an example signal exchange, such as a packet exchange, between the electronic device 102A and the electronic device 102B to generate a channel estimate for a given channel in accordance with one or more implementations. The channel estimate may in turn be utilized to generate an aggregated wideband channel estimate, which may then be used to determine, e.g., a time of arrival estimation, as is discussed further below with respect to FIG. 4. For explanatory purposes, the signal exchange is described herein with reference to the electronic devices 102A-B of the network environment 100 of FIG. 1; however, the signal exchange is not limited to the electronic devices 102A-B of the network environment 100 of FIG. 1. In one or more implementations, one or more of the other electronic devices 102C-F of the network environment 100 may participate in the signal exchange. Further for explanatory purposes, the electronic device 102B is depicted as the initiator device for the signal exchange, and the electronic device 102A is depicted as the responder device for the signal exchange; however, the electronic device 102A may also be the initiator device and the electronic device 102B may be the responder device. In one or more implementations, the initiator device may be the one of the devices that has greater processing resources, power resources, and/or other resources. In one or more implementations, the initiator device may initiate the signal exchange by transmitting the first packet in a session setup period (as discussed further below with respect to FIGS. 6-14), and then the responder device transmits the first packet in the signal exchange (as shown in the timing diagram 300).

In FIG. 3, the electronic device 102A transmits a first signal (e.g., a first packet) to the electronic device 102B. A first loopback signal corresponding to the first signal propagates to the receiver circuit 230 of the electronic device 102A via the loopback path 225 and the electronic device 102A captures one or more samples of the loopback signal, such as time domain samples, that are captured at time $t_{r,I}$. The first signal is received by the electronic device 102B and the electronic device 102B captures one or more samples, such as time domain samples, from the received first signal at time $t_{i,r}$.

After an amount of time c elapses, the electronic device 102B transmits a second signal to the electronic device 102A. A second loopback signal corresponding to the second signal propagates to the receiver circuit of the electronic device 102B via the loopback path and the electronic device 102B captures one or more samples of the loopback signal, such as time domain samples, at time $t_{i,I}$. The second signal is received by the electronic device 102A and the electronic device 102A captures one or more samples, such as time domain samples, from the received second signal at time $t_{r,r}$.

Since the first loopback signal and the second received signal are both received via the receiver circuit 230 of the electronic device 102A, both signals are substantially equally impacted by detection delays and/or other internal delays associated with the electronic device 102A. Similarly, since the first received signal and the second loopback signal are both received via the receiver circuit of the electronic device 102B, both signals are substantially equally impacted by detection delays and/or other internal delays associated with the electronic device 102B.

In one or more implementations, the samples may be captured by the respective electronic devices 102A-B, for example, using respective 128 sample timers, such that the samples can be processed using 128-modulo arithmetic; however, the samples may be captured at any sampling period. Since the samples captured at time $t_{r,I}$ and the samples captured at time $t_{r,r}$ are captured using the same sample timer of the electronic device 102A, the windows corresponding to the times $t_{r,I}$ and $t_{r,r}$ may be time aligned to the sample timer of the electronic device 102A. Similarly, since the samples captured at time $t_{i,I}$ and the samples captured at time $t_{i,r}$ are captured using the same sample timer of the electronic device 102B, the windows corresponding to the times $t_{i,I}$ and time $t_{i,r}$ may be time aligned to the sample timer of the electronic device 102B.

Thus, in FIG. 3 the group delay for each window may be represented as follows:

$$t_{r,i} = t_0$$

$$t_{i,r} = t_0 + b + d$$

$$t_{i,i} = t_0 + b + c + d$$

$$t_{r,r} = t_0 + b + c + 2d.$$

In the case that the channel between the electronic device 102A and the electronic device 102B is, or can be considered to be, reciprocal, such as for a small c, the round-trip time (RTT) can be calculated as: $2d = t_{r,r} - t_{r,i} + t_{i,r} - t_{i,i}$. Thus, the group delay bias between the electronic devices 102A-B, can be estimated as $2b = t_{r,r} - t_{r,i} + t_{i,r} - t_{i,i}$. Thus, b may represent the clock offset between the electronic devices 102A-B. Furthermore, by cross-correlating and normalizing the receive windows of the electronic devices 102A-B, the multipath cancels out, e.g., $t_{r,r} - t_{i,i} = \text{freq}[H^*_{r,r}(f)H_{i,r}]$. Subcarriers in deep nulls should not be used to estimate the group delay bias as the noise may be amplified in the normalization.

The distance for each direction can then be computed independently or coherently combined using the following relationships:

$$d_{i,i} = t_{i,r} - t_{r,i} - b$$

$$d_{r,r} = t_{r,r} - t_{i,i} + b.$$

The frequency signal in each direction may be obtained using the above relationships and the corresponding captured samples, as is discussed further below with respect to FIG. 4. The frequency signals may be used to generate a channel estimate in each direction, such as in relation to a known reference signal in each direction, and the channel estimates may be combined to form a channel estimate for the channel. The channel estimate for the channel may be aggregated with channel estimates for other channels to generate an aggregated channel estimate as is discussed further below with respect to FIG. 4. In one or more implementations, the signal exchange depicted in FIG. 3 may be performed and/or repeated using one or more of the packet exchanges discussed further below with respect to FIGS. 6-14.

Since the above relationships involve dividing b by two, a time ambiguity and/or phase ambiguity may result. The time ambiguity may be resolved independently and the phase ambiguity may be resolved and/or compensated, for example, by using overlapping subcarriers when aggregating the channel estimates and/or performing an exhaustive search of the phases. In one or more implementations, the phase and time biases due to the RF frontend and antenna that are lumped into the distance d may not be truly constant over time and/or between different antennas/cores. For example, in some device pairs the distance phase ambiguity may be quarter cycle, such as at 2.4 GHz. In one or more implementations, the ambiguity may effectively be a float, although this ambiguity may be resolved at the chipset level. In one or more implementations, the time-rate-of-change of the group delay bias b between the electronic devices 102A-B during an RTT measurement may be minimized and the antenna phase may be characterized as a function of angle of arrival.

Although the signal exchange between the electronic devices 102A-B in FIG. 3 is performed for a single channel, in one or more implementations, the signal exchange may be performed across multiple channels, e.g. in parallel, and/or across multiple communication protocols, such as Wi-Fi, Bluetooth, Zigbee, etc., to obtain multiple estimates. For example, the electronic device 102A can transmit the first signal on a first channel via a first communication protocol, transmit the first signal on a second channel via a second communication protocol that differs from the first communication protocol, transmit the first signal on a third channel via the first communication protocol, and then receive the second signal on the first channel via the first communication protocol, receive the second packet on the second channel via the second communication protocol, and receive the second packet on the third channel via the first communication protocol. In one or more implementations, the signal exchange can be performed in parallel on a single channel and/or across multiple channels using multiple cores and/or multiple antennas. In the case of performing the signal exchange on the same channel using multiple cores and/or multiple antennas, the samples from the core and/or antenna that provide the best result may be selected for the channel estimate.

Figure 4:
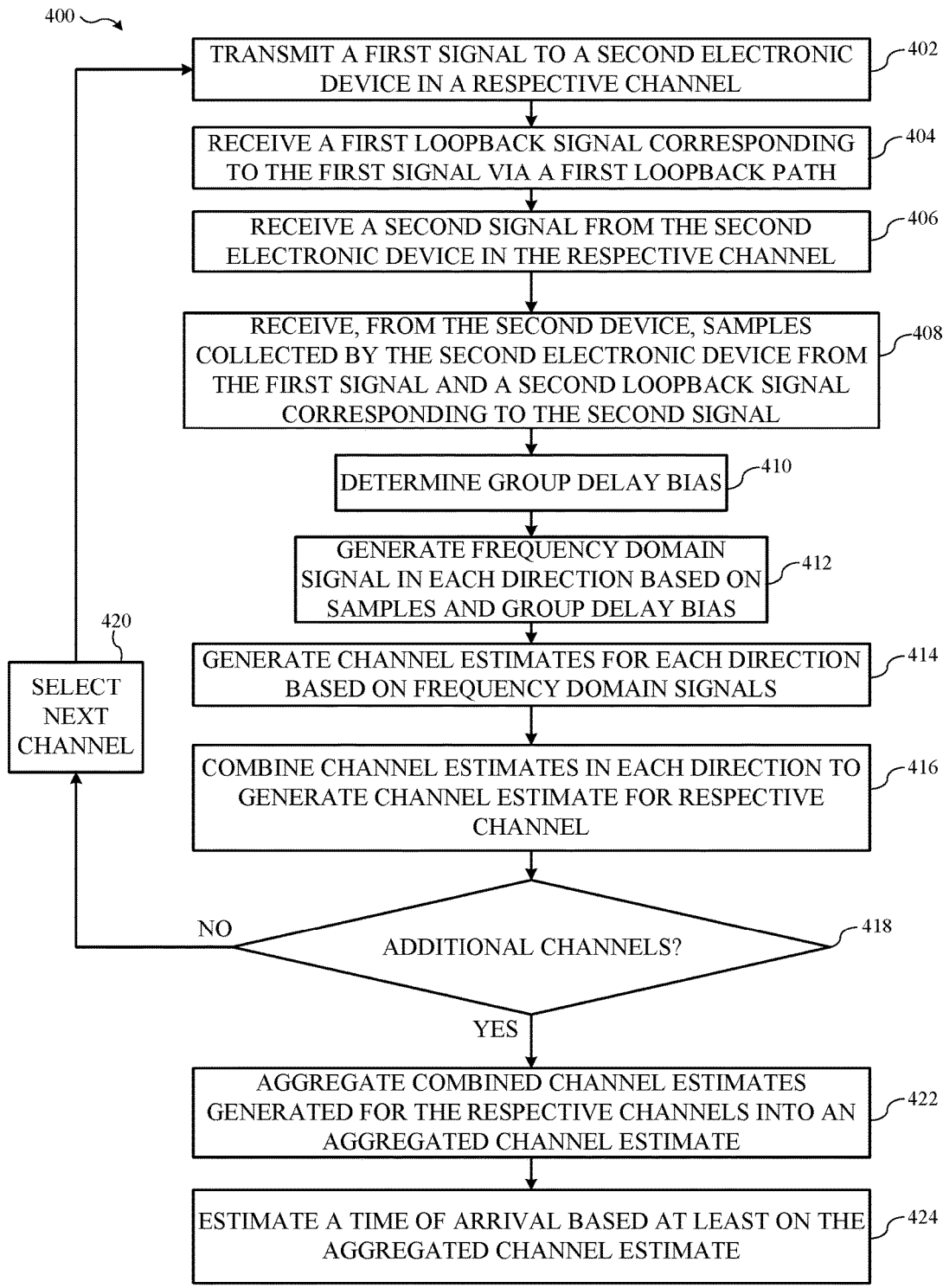
FIG. 4 illustrates a flow diagram of an example process of generating an aggregated channel estimate for facilitating a time of arrival estimation in accordance with one or more implementations.

FIG. 4 illustrates a flow diagram of an example process 400 of generating an aggregated channel estimate for facilitating a time of arrival estimation in accordance with one or more implementations. For explanatory purposes, the process 400 is primarily described herein with reference to the electronic devices 102A-B of the network environment 100 of FIG. 1 and the example signal exchange illustrated in FIG. 3. However, the process 400 is not limited to the electronic devices 102A-B or the example signal exchange of FIG. 3, and one or more blocks (or operations) of the process 400 may be performed by one or more components of the electronic devices 102A-B. In one or more implementations, one or more of the other electronic devices 102C-F of the network environment 100 may participate in the process 400. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

In the process 400, the electronic device 102A transmits a first signal, such as a first packet, to the electronic device 102B in a channel (402). In one or more implementations, the electronic devices 102A-B may perform a session setup procedure to initiate the process 400 and identify or select the channel, as is discussed further below with respect to FIGS. 6-14. The electronic device 102A receives a first loopback signal corresponding to the first signal via a first loopback path, such as the loopback path 225 (404). The electronic device 102A obtains one or more samples, such as time domain samples, from the received first loopback signal. The electronic device 102A receives a second signal from the electronic device 102B in the channel (406). The electronic device 102A obtains one or more samples, such as time domain samples from the received second signal.

The electronic device 102A receives, from the electronic device 102B, samples obtained by the electronic device 102B from the first signal received by the electronic device 102B and samples obtained from a second loopback signal received by the electronic device 102B in conjunction with the transmission of the second signal (408). The samples received by the electronic device 102A may be the time domain samples captured by the electronic device 102B and/or the received samples may have been converted to the frequency domain and filtered, such as through using a matched filter. Example captured time domain samples are discussed further below with respect to FIG. 15. In one or more implementations, the electronic device 102B may not report the captured samples to the electronic device 102A until after a number of channels have been measured, as is discussed further below with respect to FIGS. 10-14.

The electronic device 102A may convert the time domain samples to the frequency domain, e.g., using a fast Fourier transform, and may filter the samples, such as through a matched filter. Example outputs of such a matched filter are discussed further below with respect to FIG. 16. The electronic device 102A utilizes the processed samples to determine the group delay bias, such as by using the relationships discussed above with respect to FIG. 3 (410). The electronic device 102A generates the frequency domain signals in each direction based on the processed samples and the determined group delay bias, such as by using the relationships discussed above with respect to FIG. 3 (412). The electronic device 102A generates the channel estimates for each direction based at least in part on the determined frequency domain signals in each direction (414). For example, the electronic device 102A may divide the frequency signals by a frequency signal corresponding to a known reference signal for the channel to generate the channel estimate.

The electronic device 102A combines the channel estimates in each direction to generate a channel estimate for the channel (416). In one or more implementations, the channel estimates may be time aligned and/or phase coherent as is discussed further below with respect to FIG. 18.

The electronic device 102A determines whether the channel estimates have been generated for the channels that will be utilized to form the aggregated wideband channel estimate (422). When the electronic device 102A determines that a channel estimate has not been generated for a utilized channel, such as a channel being utilized for a given sounding protocol as discussed further below with respect to FIGS. 6-14, the electronic device 102A selects a next channel (420) and repeats (402)-(416) for the next channel. In this regard, the exchange of packets and the frequency domain channel estimate may be performed in one or more additional channels to generate one or more additional combined channel estimates.

As is discussed further below with respect to FIGS. 10-14, the number of channels for which the signal exchange can be performed may be limited based on a coherence time associated with the channels and/or the wireless environment. Thus, if the coherence time associated has elapsed, the electronic device 102A may not select the next channel (420), even when there are additional channels to select.

When the electronic device 102A determines that a channel estimate has been generated for each of the utilized channels (418), the electronic device 102A aggregates the channel estimate generated for each channel into an aggregated wideband channel estimate (422), such as an aggregated wideband channel estimate that is discussed further below with respect to FIG. 19. In one or more implementations, the aggregated wideband channel estimate may effectively be a wideband channel estimate, for example, if there are no significant gaps in the spectrum. The aggregation of the channel estimates may utilize overlapping subcarriers that only require time synchronization and do not require phase synchronization, or the aggregation may be performed using phase-coherent ranging. In the case of overlapping subcarriers, the phase can be resolved by matching the phase in the overlapping subcarriers.

After generating the aggregated wideband channel estimate (424), the electronic device 102A may estimate a time of arrival (and/or angle of arrival) based at least on the aggregated wideband channel estimate (424). In one or more implementations, an inverse fast Fourier transform (IFFT) may be applied to find the first reflection and determine the time of arrival estimation.

In one or more implementations, a multipath-aware ranging estimator may be utilized that makes use of a sum-of-complex-sinusoid model in the frequency domain, such as when the peaks interfere. In this instance, each of the multiple paths may have a time delay and a complex gain, e.g., $H(f_j)=\Sigma_{k=1}^{K}\alpha_k \exp[-i2\pi f_j \tau_k]+N(f_j)$. In one or more implementations, one or more other algorithms, such as super resolution methods (e.g., MUSIC, ESPRIT, matrix pencil (MP), etc.), may be utilized to find the first reflection and determine the time of arrival estimation.

Although the foregoing describes using the aggregated wideband channel estimate to determine the time of arrival estimation and the first reflection, in one or more implementations, the aggregated wideband channel estimate may be utilized for determining other parameters and/or for performing other operations. For example, in ranging applications, the aggregated wideband channel estimate may be utilized to estimate an angle of arrival, such as in cases where antenna arrays, such as phased arrays, are utilized for the transmission and/or reception of signals. Furthermore, although the foregoing describes the signal exchange occurring across multiple channels in serial, in one or more implementations, the signal exchange can be performed across two or more of the channels in parallel and/or multiple times over a single channel in serial.

Figure 5:
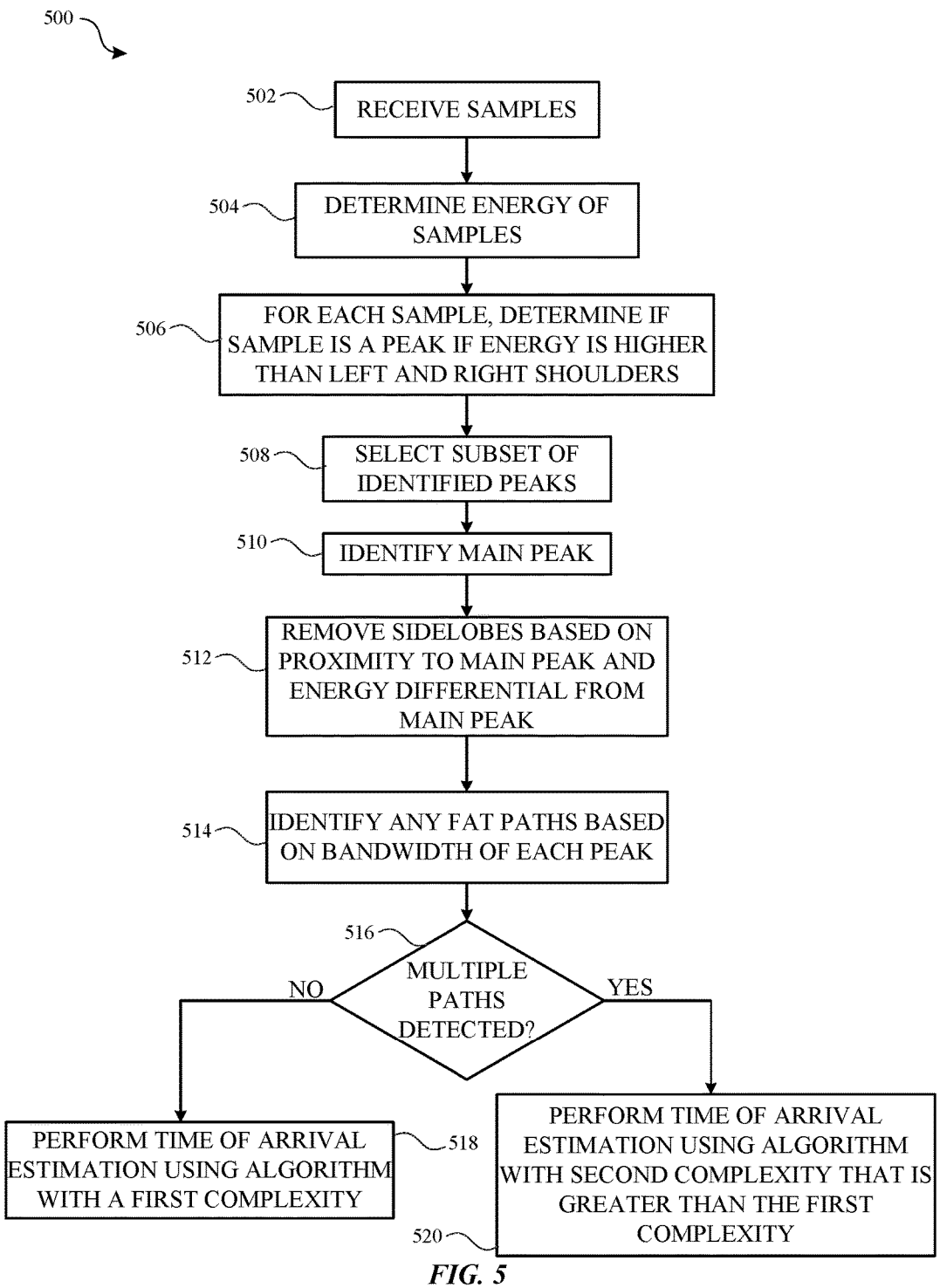
FIG. 5 illustrates a flow diagram of an example process of multipath detection for facilitating a time of arrival estimation in accordance with one or more implementations.

FIG. 5 illustrates a flow diagram of an example process 500 of multipath detection for facilitating a time of arrival estimation in accordance with one or more implementations. For explanatory purposes, the process 500 is primarily described herein with reference to the electronic device 102A of FIGS. 1-2. However, the process 500 is not limited to the electronic device 102A, and one or more blocks (or operations) of the process 500 may be performed by one or more components of the electronic device 102A. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

In the process 500, the electronic device 102A receives samples, such as time domain samples, corresponding to a received signal (502). For example, the samples may be an output of an IFFT performed on the frequency domain match filter output. In one or more implementations, the samples may be 512 samples, or any number of samples. The electronic device 102A determines the energy of the each of the samples (504). For each sample, the electronic device 102A determines that the sample is a peak sample when its energy is higher than both its left and right shoulders, e.g. the left and right neighboring samples (506). A graph illustrating example sample energies is discussed further below with respect to FIG. 21, and example pseudocode for detecting the peak samples is discussed further below with respect to FIG. 24.

The electronic device 102A selects a subset of the identified peak samples (508). For example, the electronic device 102A may select the top N peak samples in terms of energy or may select the peak samples that meet a certain energy threshold, such as a threshold based on the maximum peak energy or SNR. In one or more implementations, the electronic device 102A may select the first N peaks, such as the first 10 peaks, that are within X decibels, such as 10 decibels, of the maximum peak energy. The electronic device 102A also identifies the main peak sample which is the peak sample that corresponds to the maximum peak energy (510).

The electronic device 102A identifies and removes any samples corresponding to sidelobes based at least in part on a proximity of any such samples to the main peak sample and an energy differential between any such samples and the main peak sample (512). For example, the electronic device 102A may determine that peak samples that are a number of samples (or distance) away from the main peak sample, such as twelve to sixteen samples away, and have an energy that is X decibels lower than the main peak energy, such as 9 decibels lower than the main peak energy, are sidelobe samples. Example pseudocode for sidelobe rejection is discussed further below with respect to FIG. 25.

The electronic device 102A identifies any fat paths based at least in part on the bandwidth of the peak associated with each remaining peak sample (514). A fat path may refer to a peak that covers multiple paths. For example, the electronic device 102A may measure the bandwidth of each remaining peak at one or more energy levels lower than the energy level of the peak, such as at the 3 decibel and/or 6 decibel bandwidth. If either measurement exceeds an expected bandwidth by more than a threshold amount, the peak sample is determined to correspond to a fat path. In one or more implementations, if either bandwidth measurement is narrower than the expected bandwidth by more than a threshold amount, the electronic device 102A may inspect whether the bandwidth variation is due to a combing effect of another signal path. Example pseudocode for fat path detection is discussed further below with respect to FIG. 26.

The electronic device 102A determines whether multiple paths were detected for the received signal, such as whether multiple peak samples remain in the subset of peak samples and/or whether any fat paths were detected (516). If the electronic device 102A detects that only a single path is present (516), the electronic device 102A performs a time of arrival estimation using an algorithm that has a first computational complexity, such as a low computational complexity (518). For example, the electronic device 102A may convert the frequency domain match filter output to time domain using IFFT and may then apply various low computational complexity methods to determine the first arriving path, such as thresholding based on the maximum peak energy. In one or more implementations, the algorithms may further include thresholding optimizations, such as using SNR and peak combined thresholding.

If the electronic device 102A detects the presence of multiple paths (416), the electronic device 102A performs a time of arrival estimation using an algorithm with a second computational complexity that is greater than the first computational complexity (520). For example, the electronic device 102A may utilize the MUSIC or ESPRIT algorithms. The electronic device 102A may provide any information obtained from blocks (502)-(514), such as an estimate of the multiple path position/phase from the time domain correlation, the sidelobe rejection, fatpath detection, combing effect, etc., to the algorithm being used for the time of arrival estimation.

In one or more implementations, the electronic device 102A may adjust the switching criteria between the high and low computation complexity algorithms to tradeoff the complexity with performance. For example, the electronic device 102A may reduce the percentage of the MUSIC enable ratio based at least in part on the severity of the multipath, such as the number of multipath signals detected. Furthermore, based on the SNR of the multipath, the electronic device 102A may select the low complexity algorithm for low SNR more often than the high complexity algorithm, e.g. because the high complexity algorithms may not perform well with low SNR. Example graphs illustrating the performance of the multipath detection are discussed further below with respect to FIGS. 22 and 23.

The computational complexity of the algorithm may impact whether the algorithm can be performed by the firmware of the WiFi chipset of the electronic device 102A, or if the algorithm needs to be performed by the processing circuit 250 of the electronic device 102A. The processing circuit 250 may be capable of performing algorithms with higher computational complexity; however, additional latency may be incurred by performing the algorithms at the processing circuit 250 rather than at the WiFi chipset.

Figure 6:
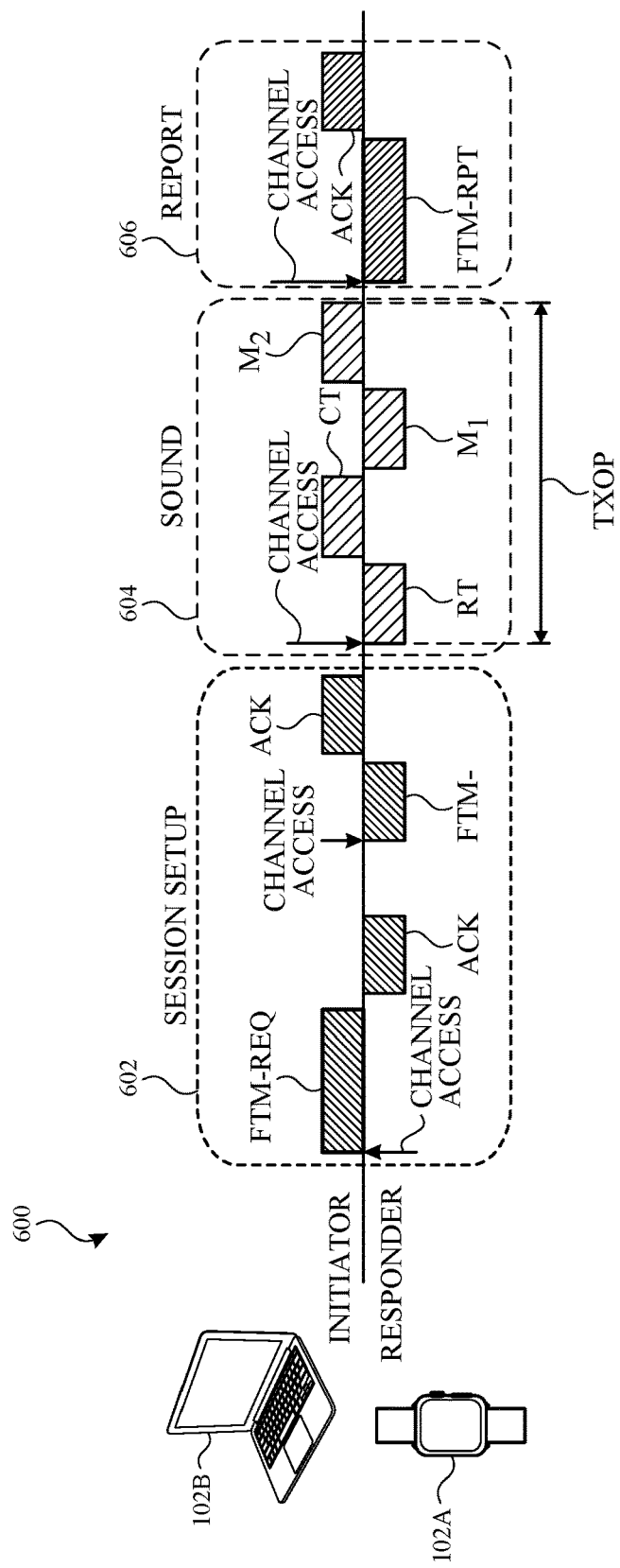
FIG. 6 illustrates a timing diagram of an example signal exchange in accordance with one or more implementations.

FIG. 6 illustrates a timing diagram 600 of an example signal exchange, such as a packet exchange, between the electronic devices 102A-B in accordance with one or more implementations. The signal exchange may be used to perform, for example, multipath detection as discussed above with respect to FIG. 5. For explanatory purposes, the example signal exchange is described herein with reference to the electronic devices 102A-B of the example network environment 100 of FIG. 1; however, the signal exchange is not limited to the electronic devices 102A-B of the example network environment 100 of FIG. 1. In one or more implementations, one or more of the other electronic devices 102C-F of the network environment 100 may participate in the signal exchange. Further for explanatory purposes, the electronic device 102B is depicted as the initiator device for the signal exchange, and the electronic device 102A is depicted as the responder device for the signal exchange; however, the electronic device 102A may be the initiator device and the electronic device 102B may be the responder device. In one or more implementations, the responder and the initiator roles may be determined based on one or more of available power resources, available processing resources, and/or generally any available resources at the electronic devices 102A-B.

The timing diagram 600 includes a session setup period 602, a sounding period 604, and a reporting period 606. In the session setup period 602, the initiator device, such as the electronic device 102B, requests a two-way signal exchange with the responder device, such as the electronic device 102A, during a channel access period. The electronic device 102B may request the two-way signal exchange, for example, to perform a time of arrival estimation, an angle of arrival estimation, or the like. For example, the electronic device 102B may transmit a fine timing measurement request (FTM-Req) to the electronic device 102A. The fine timing measurement request may be formatted as indicated by the Institute of Electrical and Electronics Engineers ("IEEE") 802.11mc specification.

The electronic device 102A may respond with an acknowledgement packet. At the next channel access period, the electronic device 102A may transmit a response, such as a fine timing measurement response message, and the electronic device 102B may respond with an acknowledgment packet. The sounding period 604 may begin at the next channel access period, at which time the electronic device 102A may transmit a request to send (RTS) frame and the electronic device 102B may respond with a clear to send (CTS) frame. The exchange of the RTS/CTS frames may provide network allocation vector (NAV) protection to nearby WiFi devices.

The electronic device 102A may then transmit a signal $M_1$ and the electronic device 102B may respond with a signal $M_2$. The signal $M_1$ and/or the signal $M_2$ may be and/or may include, for example, a ranging signal, a ranging packet, a secure waveform, a null data packet (NDP), an 802.11 frame, or generally any signal. The samples collected during the exchange of $M_1$ and $M_2$ may occur as described above with respect to FIG. 4. The reporting period 606 may begin at the next channel access period at which time the electronic device 102A may transmit a reporting signal to the electronic device 102B. The reporting signal may be, for example, a fine timing measurement reporting (FTM-Rpt) frame. In one or more implementations, the reporting signal may include the samples collected by the electronic device 102A corresponding to the reception of $M_2$, as well as the samples collected by the electronic device 102A corresponding to the loopback signal received in conjunction with the transmission of $M_1$. The electronic device 102B may respond with an acknowledgment packet. In one or more implementations, if $M_1$ and $M_2$ are normal IEEE 802.11 frames, then the RTS/CTS exchange may be omitted.

Figure 7:
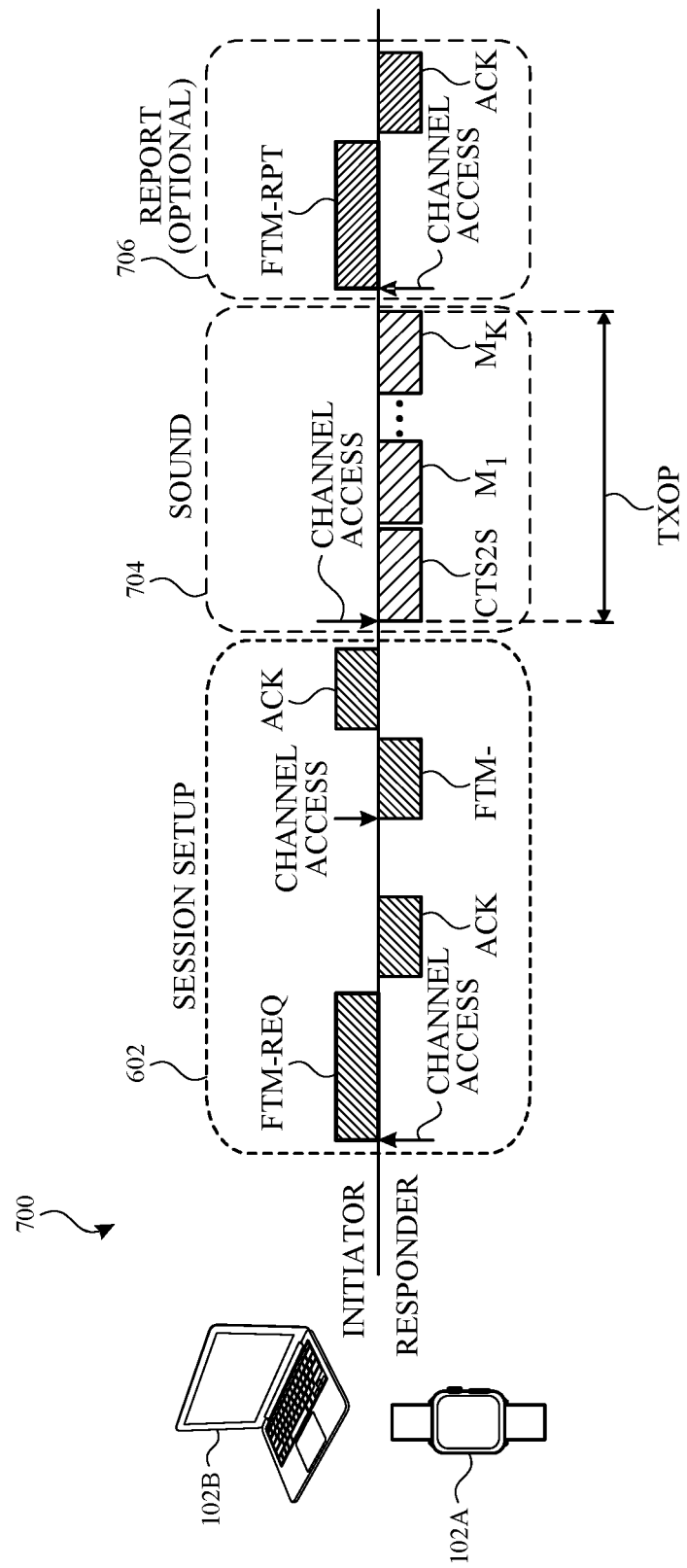
FIG. 7 illustrates a timing diagram of an example one-way signal transmission in accordance with one or more implementations.

FIG. 7 illustrates a timing diagram 700 of an example one-way signal transmission in accordance with one or more implementations. The signal transmission may be used to perform, for example, multipath detection as discussed above with respect to FIG. 5. For explanatory purposes, the example signal transmission is described herein with reference to the electronic devices 102A-B of the example network environment 100 of FIG. 1; however, the signal transmission is not limited to the electronic devices 102A-B of the example network environment 100 of FIG. 1. In one or more implementations, one or more of the other electronic devices 102C-F of the network environment 100 may participate in the signal exchange. Further for explanatory purposes, the electronic device 102B is depicted as the initiator device for the signal exchange, and the electronic device 102A is depicted as the responder device for the signal exchange; however, the electronic device 102A may be the initiator device and the electronic device 102B may be the responder device.

The timing diagram 700 includes a session setup period 602, a sounding period 704, and an optional reporting period 706. The electronic device 102B may request the one-way signal transmission, for example, to perform an angle of arrival estimation. The session setup period 602 is performed as described above with respect to FIG. 6. At the next channel access period the sounding period 704 begins with the electronic device 102A transmitting a clear-to-send-to-self (CTS2SELF) frame. The CTS2SELF frame may provide NAV protection to nearby WiFi devices. The electronic device 102A then transmits one or more signals to the electronic device 102B, such as $M_1, \ldots M_k$. At the next channel access period, an optional reporting period 706 may begin when the electronic device 102B may send a reporting signal, such as an FTM-Rpt frame to the electronic device 102A, and the electronic device 102A may respond with an acknowledgment packet.

In one or more implementations, a one-way signal transmission may be a passive procedure. For example, during an active or passive scan the electronic device 102B may scan for beacons or WiFi frames from neighboring access points, such as the electronic device 102F. The electronic device 102B may derive the WiFi channel state information from beacons, probe responses, and/or any other 802.11 frames.

Figure 8:
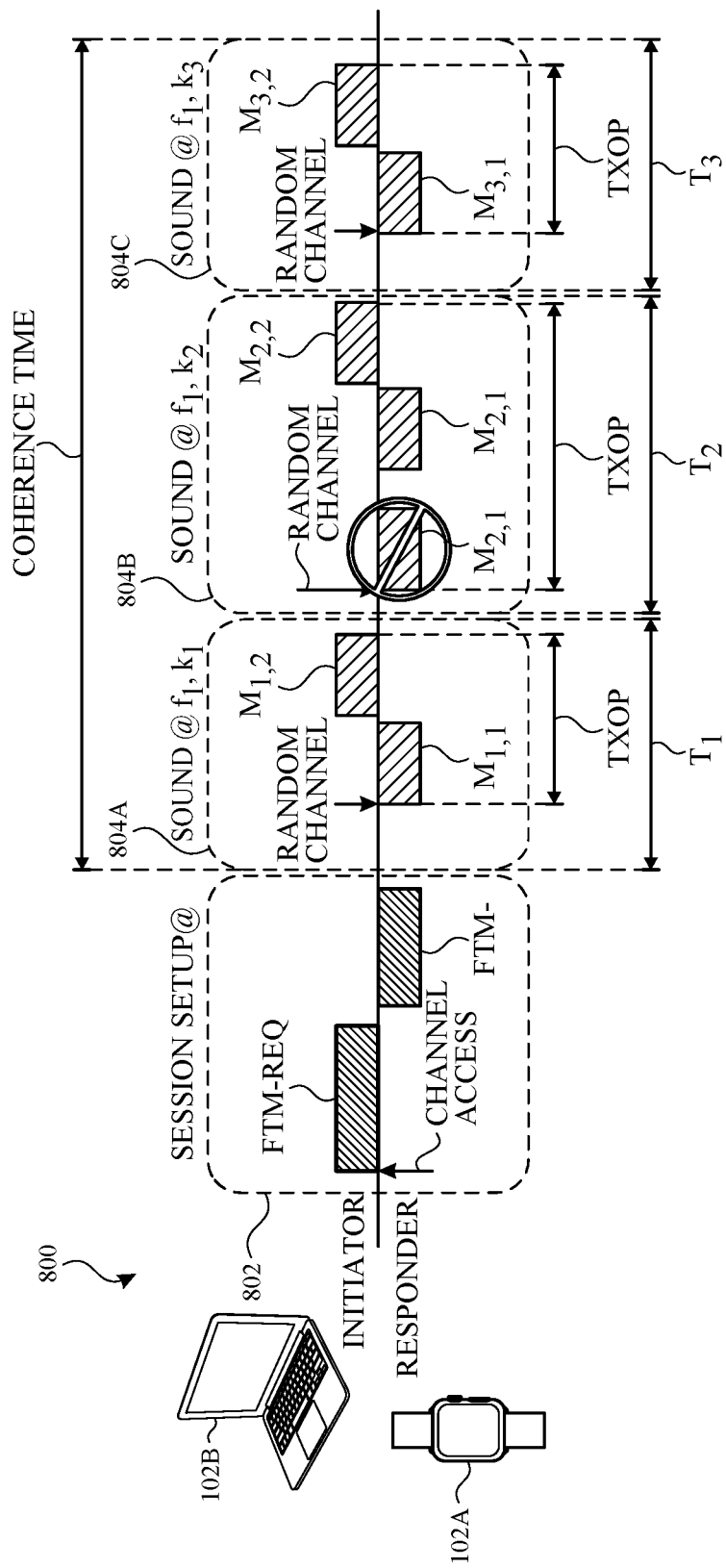
FIG. 8 illustrates a timing diagram of example chained signal exchanges in accordance with one or more implementations.

FIG. 8 illustrates a timing diagram 800 of example chained signal exchanges in accordance with one or more implementations. The chained signal exchanges may be used to perform, for example, multipath detection as discussed above with respect to FIG. 5. For explanatory purposes, the chained signal exchanges are described herein with reference to the electronic devices 102A-B of the example network environment 100 of FIG. 1; however, the chained signal exchanges are not limited to the electronic devices 102A-B of the example network environment 100 of FIG. 1. In one or more implementations, one or more of the other electronic devices 102C-F of the network environment 100 may participate in the signal exchange. Further for explanatory purposes, the electronic device 102B is depicted as the initiator device for the chained signal exchanges, and the electronic device 102A is depicted as the responder device for the chained signal exchanges; however, the electronic device 102A may be the initiator device and the electronic device 102B may be the responder device.

The timing diagram 800 includes a session setup period 802 and one or more sounding periods 804A-C. The session setup period 802 may begin with the electronic device 102B transmitting a request, such as an FTM request frame, to the electronic device 102A. The electronic device 102A may respond with response, such as an FTM response frame. In one or more implementations, the electronic devices 102A-B may exchange messages (such as the FTM request and response frames) to negotiate parameters for the chained signal exchanges. The parameters may be negotiated during the session setup period 802, may be negotiated a priori by the electronic devices 102A-B, and/or the electronic devices 102A-B may be preconfigured with the parameters.

At the start of the first sounding period 804A, the electronic device 102A transmits a first signal $M_{1,1}$ to the electronic device 102B over any channel, such as a random channel previously negotiated by the electronic devices 102A-B. The first signal $M_{1,1}$ may be, may include, and/or may be encrypted by a first key $k_1$. The electronic device 102B responds by transmitting a second signal $M_{1,2}$ to the electronic device 102A. The second signal $M_{1,2}$ may be, may include, and/or may be encrypted by the first key $k_1$.

Upon successful completion of the first sounding period 804A, the electronic device 102A and/or the electronic device 102B move to the next sounding period 804B after a fixed duration of time. In this manner, the electronic devices 102A-B may remain synchronized for each signal exchange. Thus, since the amount of time allocated to each sounding period 804A-C is dependent on the successful completion of the signal exchange in the sounding period, the total amount of time allocated for each sounding period 804A-C is variable and may be dependent on the amount of time used for channel access and retries. As shown in the timing diagram 800, during the second sounding period 804B, the electronic device 102B may not initially receive the signal $M_{2,1}$, and therefore does not respond with the signal $M_{2,2}$. As shown in the timing diagram 800, the electronic device 102A retransmits the signal $M_{2,1}$ rather than moving to the next sounding period 804C. Accordingly, the second sounding period 804B may take longer than the first and third sounding periods 804A and C; however, the sounding periods 804A-C may be completed within the coherence time for the channel.

In one or more implementations, the electronic devices 102A-B may use different keys for each of the sounding periods, such as the keys $k_1$, $k_2$, and $k_3$. One or more of the keys may be generated, for example, from the previous key, such as by adding a nonce value to the previous key, and/or during a session setup period the electronic devices 102A-B may generate over the air sequences derived from one or more keys. In one or more implementations, the electronic devices 102A-B may transmit RTS/CTS frames within one or more of the sounding periods 804A-C.

Figure 9:
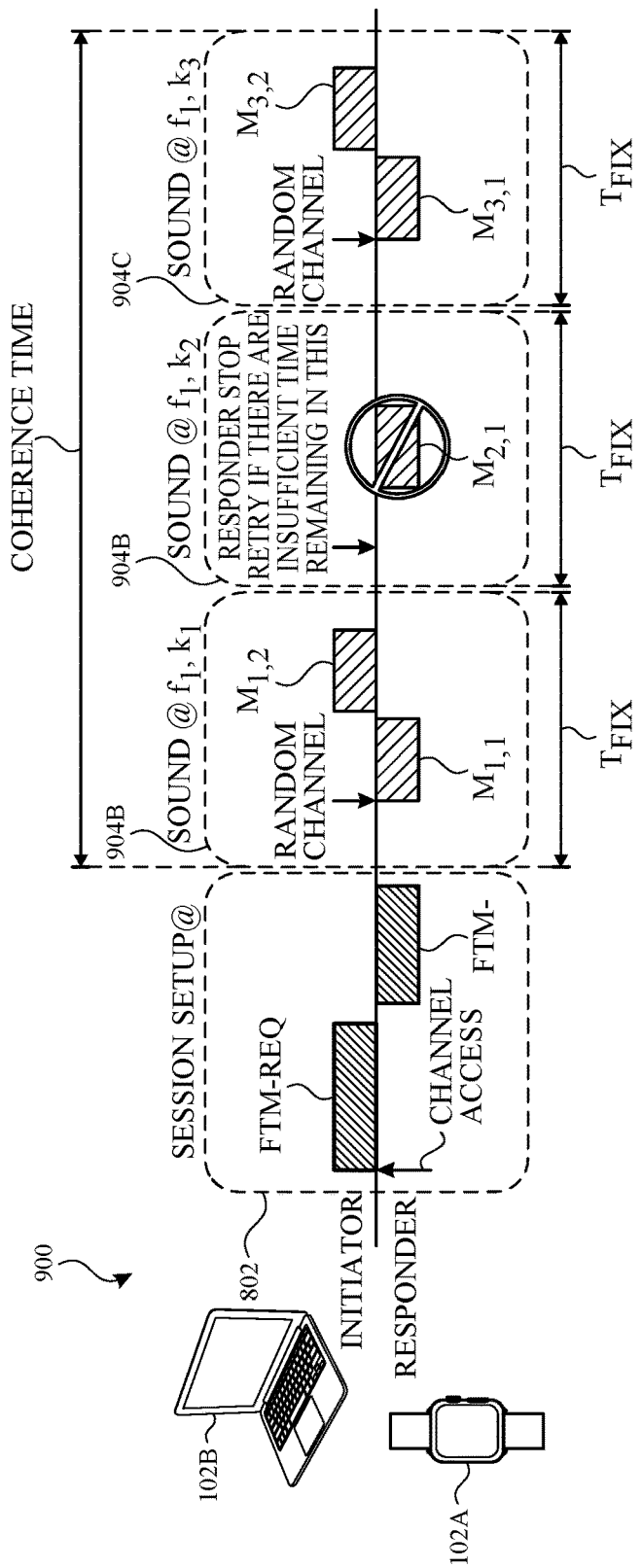
FIG. 9 illustrates a timing diagram of example chained signal exchanges using fixed timeslots in accordance with one or more implementations.

FIG. 9 illustrates a timing diagram 900 of example chained signal exchanges using fixed timeslots in accordance with one or more implementations. The chained signal exchanges may be used to perform, for example, multipath detection as discussed above with respect to FIG. 5. For explanatory purposes, the chained signal exchanges are described herein with reference to the electronic devices 102A-B of the example network environment 100 of FIG. 1; however, the chained signal exchanges are not limited to the electronic devices 102A-B of the example network environment 100 of FIG. 1. In one or more implementations, one or more of the other electronic devices 102C-F of the network environment 100 may participate in the signal exchange. Further for explanatory purposes, the electronic device 102B is depicted as the initiator device for the chained signal exchanges, and the electronic device 102A is depicted as the responder device for the chained signal exchanges; however, the electronic device 102A may be the initiator device and the electronic device 102B may be the responder device.

The timing diagram 900 includes a session setup period 802 and one or more sounding periods 904A-C. The session setup period 802 is performed as described above with respect to FIG. 8. The sounding periods 904A-C occur in a similar fashion as described above with respect to the sounding periods 804A-C of FIG. 8. However, in the timing diagram 900, a fixed amount of time ($T_{Fix}$) is allocated to each of the sounding periods 904A-C, rather than the variable amount of time allocated to each of the sounding periods 804A-C of FIG. 8.

Thus, in the sounding period 904B, the electronic device 102A stops retrying the transmission of the signal $M_{2,1}$ when there is insufficient time left in the sounding period 904B, and moves to the next sounding period 904C. The electronic device 102B and/or the electronic device 102A moves to the next sounding period 904C after the expiration of the fixed time period regardless of whether the signals were successfully exchanged during the sounding period 904B. In this manner, the electronic devices 102A-B can maintain synchronization at the start of each of the sounding periods 904A-C.

Figure 10:
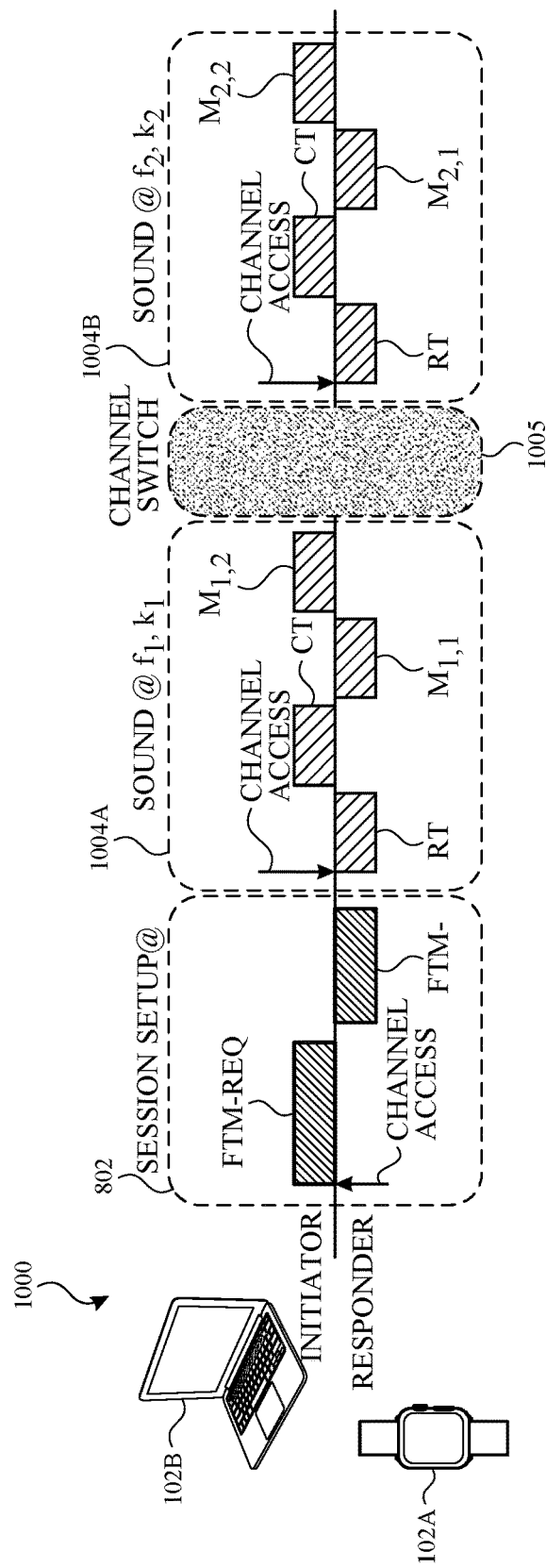
FIG. 10 illustrates a timing diagram of example chained signal exchanges across multiple channels in accordance with one or more implementations.

FIG. 10 illustrates a timing diagram 1000 of example chained signal exchanges across multiple channels in accordance with one or more implementations. The chained signal exchanges across multiple channels may be used, for example, to generate an aggregated channel estimate as discussed above with respect to FIG. 4. For explanatory purposes, the chained signal exchanges are described herein with reference to the electronic devices 102A-B of the example network environment 100 of FIG. 1; however, the chained signal exchanges are not limited to the electronic devices 102A-B of the example network environment 100 of FIG. 1. In one or more implementations, one or more of the other electronic devices 102C-F of the network environment 100 may participate in the signal exchange. Further for explanatory purposes, the electronic device 102B is depicted as the initiator device for the chained signal exchanges, and the electronic device 102A is depicted as the responder device for the chained signal exchanges; however, the electronic device 102A may be the initiator device and the electronic device 102B may be the responder device.

The timing diagram 1000 includes a session setup period 802 and one or more sounding periods 1004A-B, as well as a channel switch period 1005. The session setup period 802 is performed as described above with respect to FIG. 8. However, during the session setup period 802, the electronic devices 102A-B may also exchange additional parameters, such as a channel sequence, a channel hopping map, or other indication of the channels that will be hopped during the chained signal exchanges.

In one or more implementations, the channel sequence and/or other parameters exchanged during the session setup period 802 may be encrypted. The parameters may include, for example, cryptographic keys and/or derived sounding sequences, channel sequences, chain size, coherence time, fixed timeslot durations, reporting intervals, an RTS recovery timeout, a CTS recovery timeout, and/or generally any other parameter. One or more of the electronic devices 102A-B may dynamically adjust one or more of the parameters based on performance requirements, such as adjusting the chaining size and/or other hopping parameters.

Thus, as shown in the timing diagram 1000, the first sounding period 1004A is performed on a first channel, and after the completion of the first sounding period 1004A, the electronic devices 102A-B synchronously move to the channel switch period 1005 to switch to a different channel and begin the second sounding period 1004B on the different channel.

In one or more implementations, the electronic devices 102A-B may exchange the RTS/CTS frames at the start of each of the sounding periods. If the electronic device 102B does not receive the RTS frame after a timeout period the synchronization of the chaining is broken and the electronic device 102B returns to the base channel, e.g. the initial channel. Similarly, if the electronic device 102A does not receive the CTS frame after a timeout period the synchronization of the chaining is broken and the electronic device 102A returns to the base channel.

Figure 11:
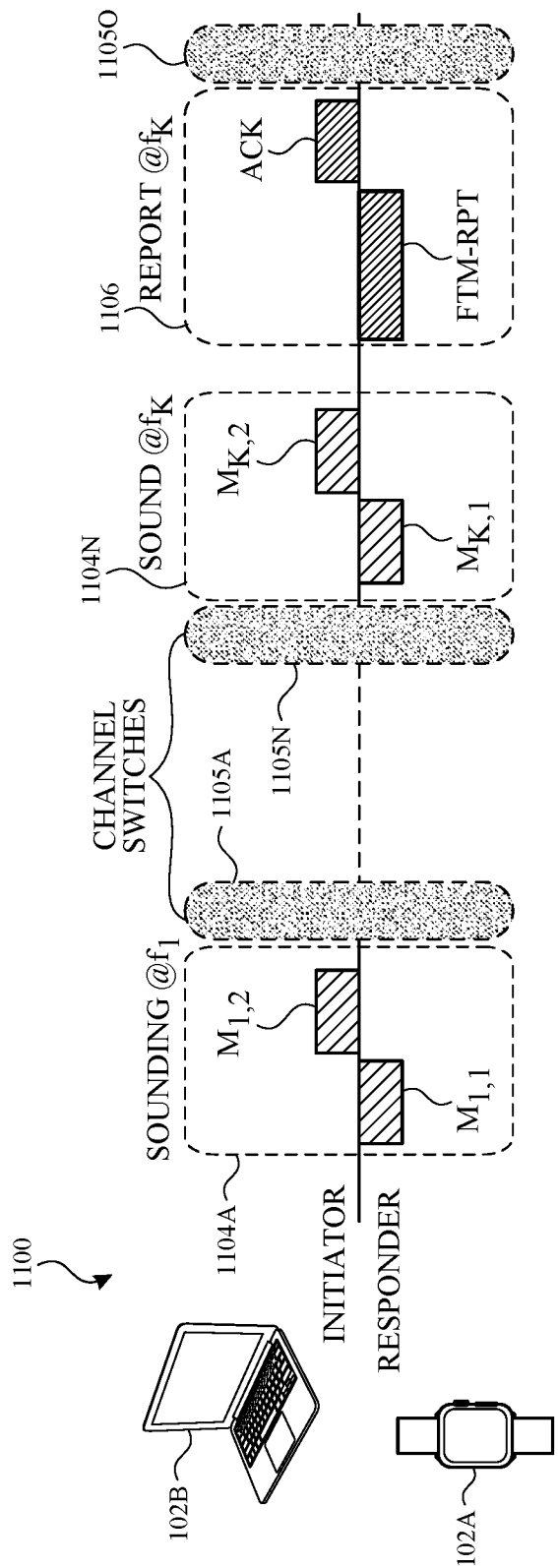
FIG. 11 illustrates a timing diagram of example chained signal exchanges across multiple channels including a reporting period in accordance with one or more implementations.

FIG. 11 illustrates a timing diagram 1100 of example chained signal exchanges across multiple channels including a reporting period in accordance with one or more implementations. The chained signal exchanges across multiple channels may be used, for example, to generate an aggregated channel estimate as discussed above with respect to FIG. 4. For explanatory purposes, the chained signal exchanges are described herein with reference to the electronic devices 102A-B of the example network environment 100 of FIG. 1; however, the chained signal exchanges are not limited to the electronic devices 102A-B of the example network environment 100 of FIG. 1. In one or more implementations, one or more of the other electronic devices 102C-F of the network environment 100 may participate in the signal exchange. Further for explanatory purposes, the electronic device 102B is depicted as the initiator device for the chained signal exchanges, and the electronic device 102A is depicted as the responder device for the chained signal exchanges; however, the electronic device 102A may be the initiator device and the electronic device 102B may be the responder device.

The timing diagram 1100 includes multiple sounding periods 1104A-B, one or more reporting periods 1106, and multiple channels switch periods 1105A-N. The electronic device 102B initiates the chained signal exchange across multiple channels with a chain size of N, a reporting interval of K, and a given channel sequence. The electronic devices 102A-B may negotiate the chain size, reporting interval, and/or channel sequence during a session setup period (not shown). In one or more implementations, the reporting interval may be determined based at least in part on the available memory of one or more of the electronic devices 102A-B. For example, the chain size N may be 6, the channel sequence may be channels 1, 3, 5, 7, 9, and 11 in 2.4 GHz, and the reporting interval K may be 3.

Thus, after performing K sounding periods 1104A-N on K (or fewer) distinct channels, the electronic devices 102A-B perform the reporting period 1106 on the last channel used for the sounding period 1104N. If the chain size N is greater than the reporting interval K, the electronic devices 102A-B synchronously move to the next channel switch period 1105O to switch channels and perform another sounding period (not shown). For example, the electronic device 102A may clear its memory after reporting the collected samples to the electronic device 102B during the reporting period 1106, thereby freeing up additional memory for collected samples.

Figure 12:
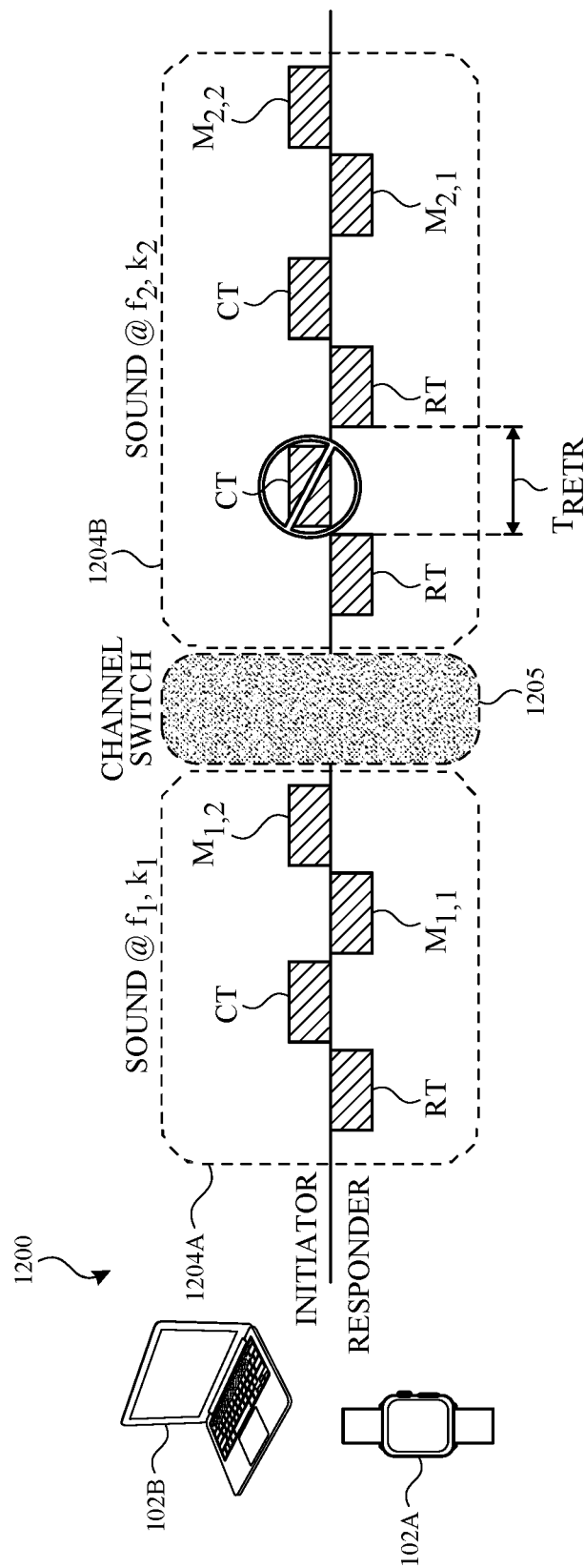
FIG. 12 illustrates a timing diagram of example chained signal exchanges across multiple channels including failure recovery in accordance with one or more implementations.

FIG. 12 illustrates a timing diagram 1200 of example chained signal exchanges across multiple channels including failure recovery in accordance with one or more implementations. The chained signal exchanges across multiple channels may be used, for example, to generate an aggregated channel estimate as discussed above with respect to FIG. 4. For explanatory purposes, the chained signal exchanges are described herein with reference to the electronic devices 102A-B of the example network environment 100 of FIG. 1; however, the chained signal exchanges are not limited to the electronic devices 102A-B of the example network environment 100 of FIG. 1. In one or more implementations, one or more of the other electronic devices 102C-F of the network environment 100 may participate in the signal exchange. Further for explanatory purposes, the electronic device 102B is depicted as the initiator device for the chained signal exchanges, and the electronic device 102A is depicted as the responder device for the chained signal exchanges; however, the electronic device 102A may be the initiator device and the electronic device 102B may be the responder device.

The timing diagram 1200 includes sounding periods 1204A-B and one or more channel switch periods 1205. The electronic devices 102A-B may exchange RTS/CTS frames at the start of one or more of the sounding periods 1204A-B. As shown in the sounding period 1204B, if the electronic device 102A does not receive a CTS frame from the electronic device 102B after transmitting an RTS frame to the electronic device 102B, the electronic device 102A retries transmitting the RTS frame after expiration of a retry timeout $T_{retry}$. Thus, the sounding periods 1204A-B may have variable lengths depending on retries, etc.

Figure 13:
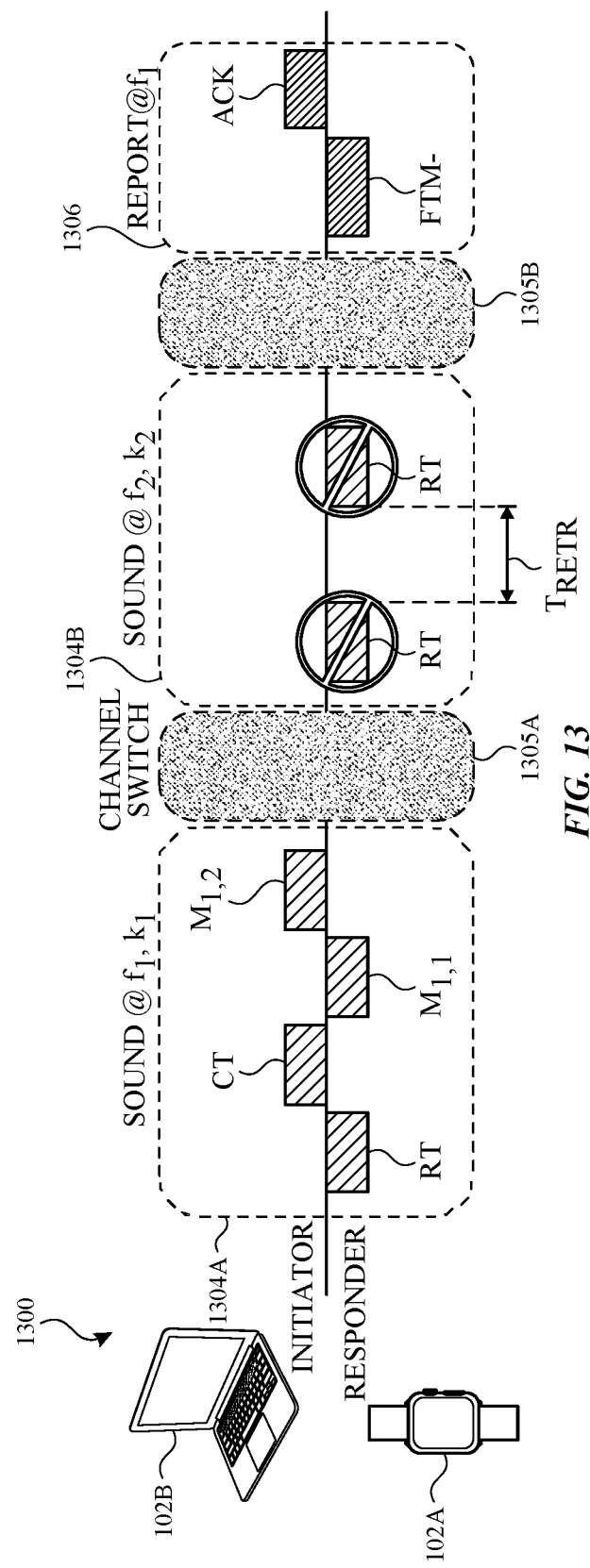
FIG. 13 illustrates a timing diagram of example chained signal exchanges across multiple channels including failure recovery in accordance with one or more implementations.

FIG. 13 illustrates a timing diagram 1300 of example chained signal exchanges across multiple channels including failure recovery in accordance with one or more implementations. The chained signal exchanges across multiple channels may be used, for example, to generate an aggregated channel estimate as discussed above with respect to FIG. 4. For explanatory purposes, the chained signal exchanges are described herein with reference to the electronic devices 102A-B of the example network environment 100 of FIG. 1; however, the chained signal exchanges are not limited to the electronic devices 102A-B of the example network environment 100 of FIG. 1. In one or more implementations, one or more of the other electronic devices 102C-F of the network environment 100 may participate in the signal exchange. Further for explanatory purposes, the electronic device 102B is depicted as the initiator device for the chained signal exchanges, and the electronic device 102A is depicted as the responder device for the chained signal exchanges; however, the electronic device 102A may be the initiator device and the electronic device 102B may be the responder device.

The timing diagram 1300 includes sounding periods 1304A-B, a reporting period 1306, and channel switch periods 1305A-B. The electronic devices 102A-B may exchange RTS/CTS frames at the start of one or more of the sounding periods 1304A-B. As shown in the sounding period 1304B, if the electronic device 102A does not receive a CTS frame from the electronic device 102B after transmitting an RTS frame to the electronic device 102B, the electronic device 102A retries transmitting the RTS frame after expiration of a retry timeout $T_{retry}$.

After the electronic device 102A exhausts a retry limit, then the electronic device 102A returns to the starting channel to perform the reporting period 1306. Similarly, in the sounding period 1304B, if the electronic device 102B does not receive a CTS frame (or a signal $M_{2,1}$) from the electronic device 102A within a predetermined amount of time, such as an amount of time that corresponds to the retry limit of the electronic device 102A, the electronic device 102B returns to the starting channel to perform the reporting period 1306 in synchronization with the electronic device 102A. As shown in the timing diagram 1300, the starting channel used by the electronic devices 102A-B to perform the reporting period 1306 is the same channel that is used by the electronic devices 102A-B to perform the first sounding period 1304A.

Figure 14:
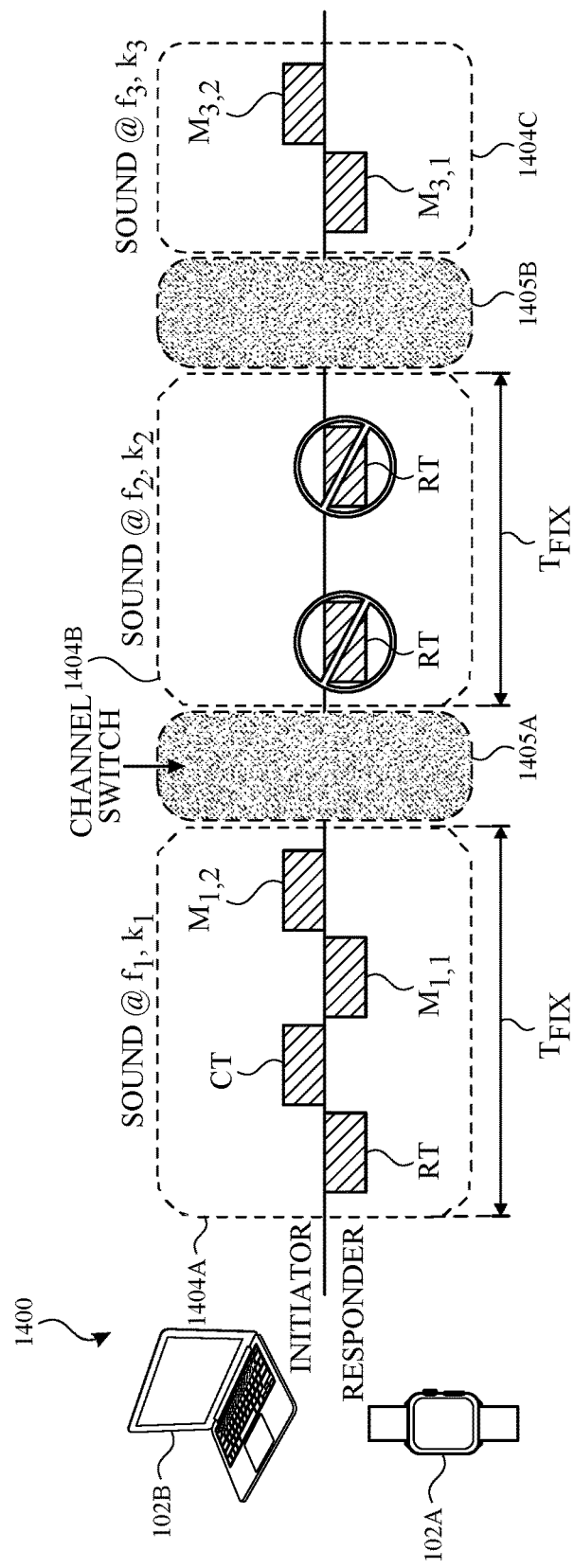
FIG. 14 illustrates a timing diagram of example chained signal exchanges using fixed timeslots and including failure recovery in accordance with one or more implementations.

FIG. 14 illustrates a timing diagram 1400 of example chained signal exchanges using fixed timeslots and including failure recovery in accordance with one or more implementations. The chained signal exchanges across multiple channels may be used, for example, to generate an aggregated channel estimate as discussed above with respect to FIG. 4. For explanatory purposes, the chained signal exchanges are described herein with reference to the electronic devices 102A-B of the example network environment 100 of FIG. 1; however, the chained signal exchanges are not limited to the electronic devices 102A-B of the example network environment 100 of FIG. 1. In one or more implementations, one or more of the other electronic devices 102C-F of the network environment 100 may participate in the signal exchange. Further for explanatory purposes, the electronic device 102B is depicted as the initiator device for the chained signal exchanges, and the electronic device 102A is depicted as the responder device for the chained signal exchanges; however, the electronic device 102A may be the initiator device and the electronic device 102B may be the responder device.

The timing diagram 1400 includes sounding periods 1404A-C and channel switch periods 1405A-B. The sounding periods 1404A-C may each be associated with a fixed timeslot, or a fixed amount of time, $T_{Fix}$. The electronic devices 102A-B may exchange RTS/CTS frames at the start of one or more of the sounding periods 1404A-B. As shown in the sounding period 1404B, if the electronic device 102A does not receive a CTS frame from the electronic device 102B after transmitting an RTS frame to the electronic device 102B, the electronic device 102A retries transmitting the RTS frame after expiration of a retry timeout $T_{retry}$.

After the electronic device 102A exhausts a retry limit (or the fixed time $T_{Fix}$ allocated for the sounding period 1404B expires) then the electronic device 102A moves to the next channel switch period 1405B to switch to the next channel in the channel sequence to perform the next sounding period 1404C. Similarly, in the sounding period 1404B, if the electronic device 102B does not receive a CTS frame (or a signal $M_{2,1}$) from the electronic device 102A within a predetermined amount of time, such as an amount of time that corresponds to the retry limit of the electronic device 102A and/or the fixed amount of time $T_{Fix}$ allocated to the sounding period 1404B, the electronic device 102B moves to the next channel switch period 1405B to switch to the next channel in the channel sequence to perform the next sounding period 1404C. In this manner, the electronic devices 102A-B may maintain synchronization at the start of each of the sounding periods 1404A-C, across the different channels.

Figure 15:
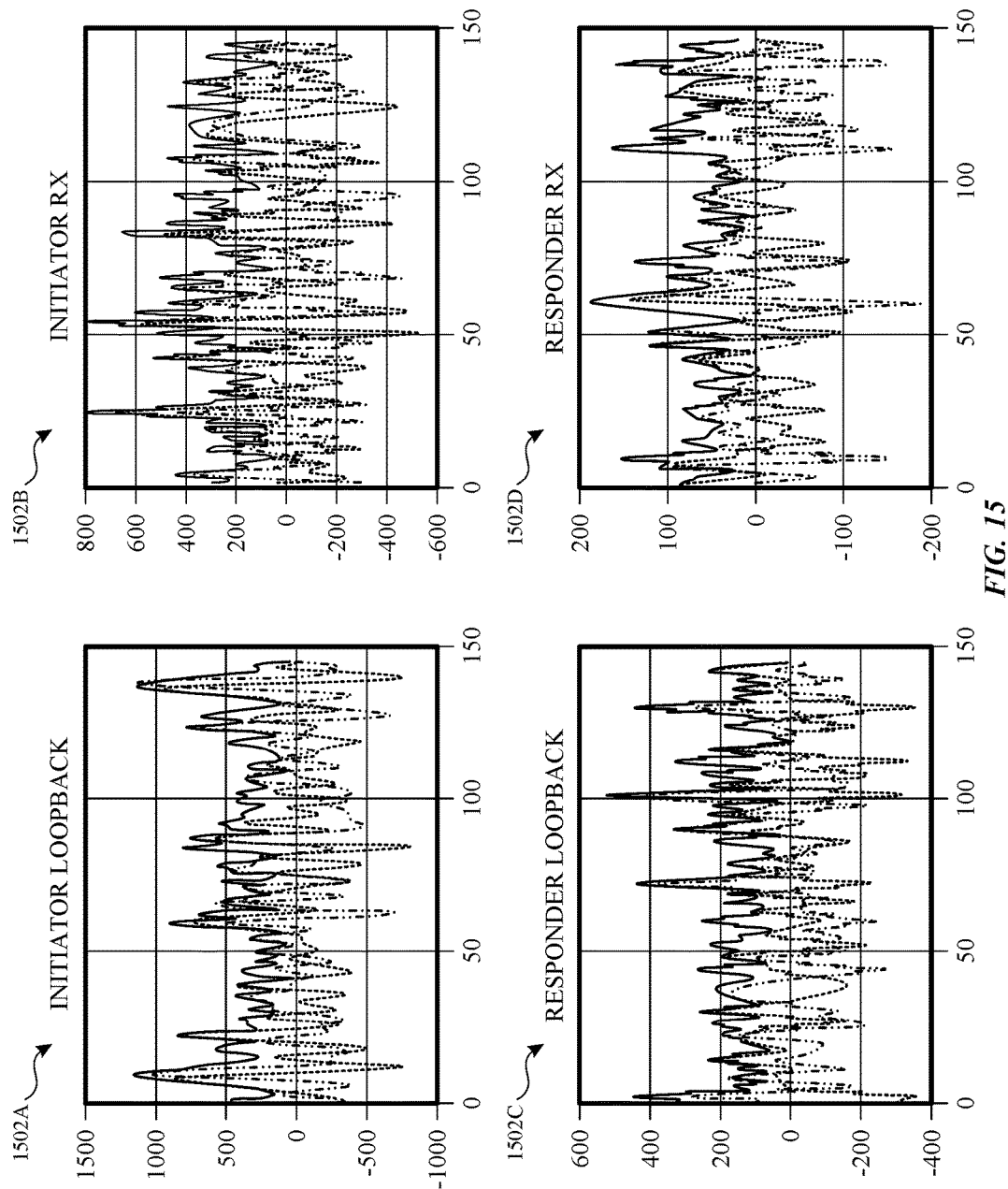
FIG. 15 illustrates graphs of captured samples of example signals in the time domain in accordance with one or more implementations.

FIG. 15 illustrates graphs 1502A-D of captured samples of example signals in the time domain in accordance with one or more implementations. The graph 1502A includes the time domain samples captured from a loopback signal received by the responder device, such as the electronic device 102A, in conjunction with transmitting a signal during a signal exchange, such as the signal exchange described above with respect to FIG. 3. The graph 1502B includes the time domain samples captured from a received signal by the responder device, such as the electronic device 102A, during a signal exchange, such as the signal exchange described above with respect to FIG. 3.

The graph 1502C includes the time domain samples captured from a loopback signal received by the initiator device, such as the electronic device 102B, in conjunction with transmitting a signal during a signal exchange, such as the signal exchange described above with respect to FIG. 3. The graph 1502D includes the time domain samples captured from a received signal by the initiator device, such as the electronic device 102B, during a signal exchange, such as the signal exchange described above with respect to FIG. 3.

In one or more implementations, the samples may include 145 I/Q samples, or generally any number of samples, and the samples may be sampled at a 40 MHz sampling rate, or generally any sampling rate. The receive windows corresponding to the graphs 1502A-D capture the middle portions of three long training field (LTF) frames which may allow for circular correlation. In one or more implementations, the window start time may be aligned with a 128 sample timer, or any sample timer, which may allow for modulo arithmetic for round trip time calculations.

Figure 16:
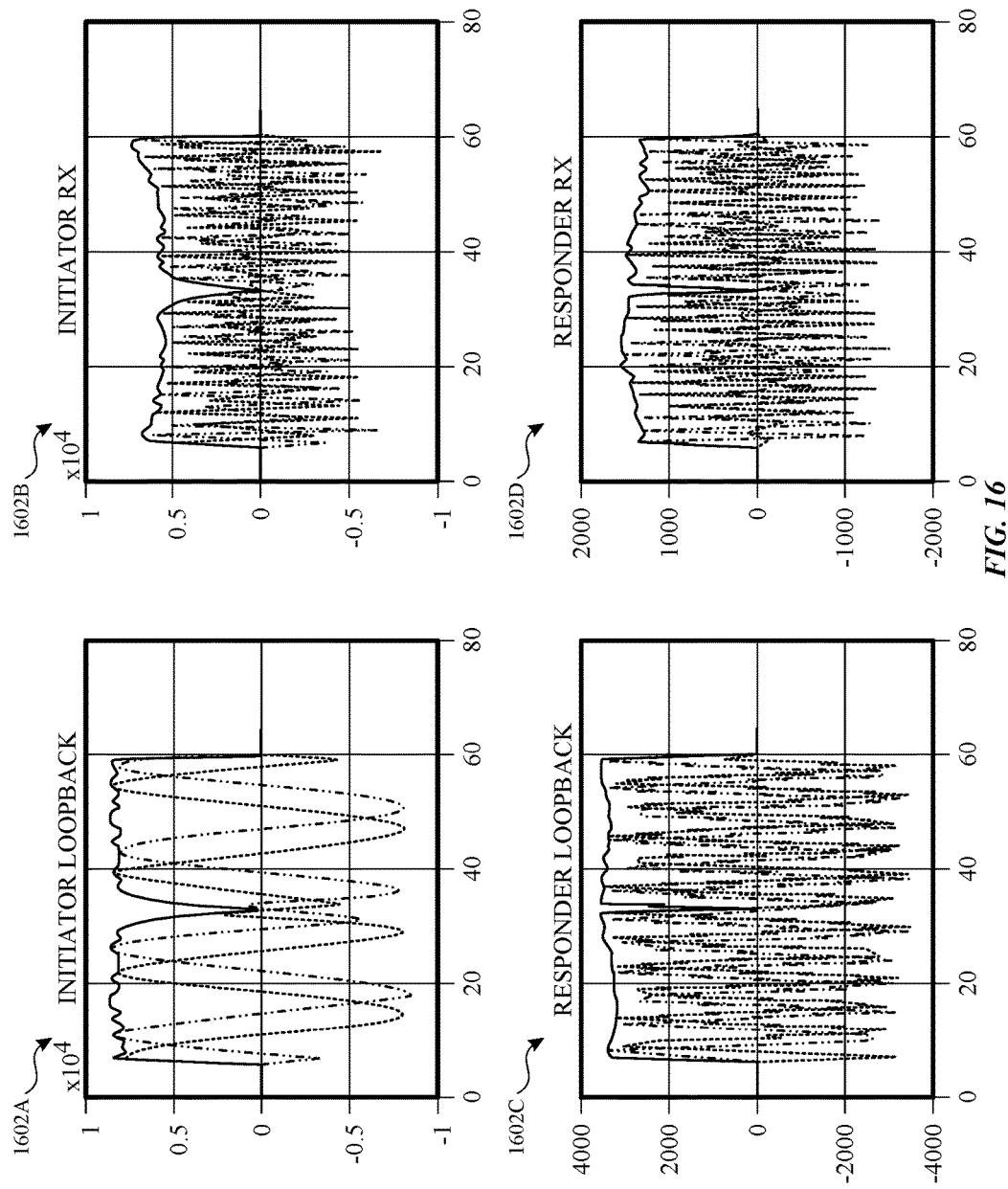
FIG. 16 illustrates graphs of matched filter outputs of the samples of the example signals in the frequency domain in accordance with one or more implementations.

FIG. 16 illustrates graphs 1602A-D of matched filter outputs of the samples of the example signals in the frequency domain in accordance with one or more implementations. The graph 1602A includes the frequency domain matched filter output that corresponds to the time domain samples of the graph 1502A. The graph 1602B includes the frequency domain matched filter output that corresponds to the time domain samples of the graph 1502B. The graph 1602C includes the frequency domain matched filter output that corresponds to the time domain samples of the graph 1502C. The graph 1602D includes the frequency domain matched filter output that corresponds to the time domain samples of the graph 1502D.

The output of the matched filter that corresponds to the graphs 1602A-D may be generated by computing the discrete Fourier transform (DFT), such as the FFT, of the first N samples, such as the first 128 samples, of the raw input data and multiplying the result by a ranging sequence, such as a 52-bit orthogonal frequency-division multiplexing (OFDM) ranging sequence. In the graphs 1602A-D, 52 subcarriers or FFT bins are used in the 128-bin FFT of the original data. In one or more implementations, the frequency of the matched filter output corresponds to the biased group delay, e.g., $H(f)=A(f)\exp[-i(2\pi f \tau_g+\theta_d)]$. In one or more implementations, the amplitude may not be flat due the transmitter, receiver, and multipath distortion.

Figure 17:
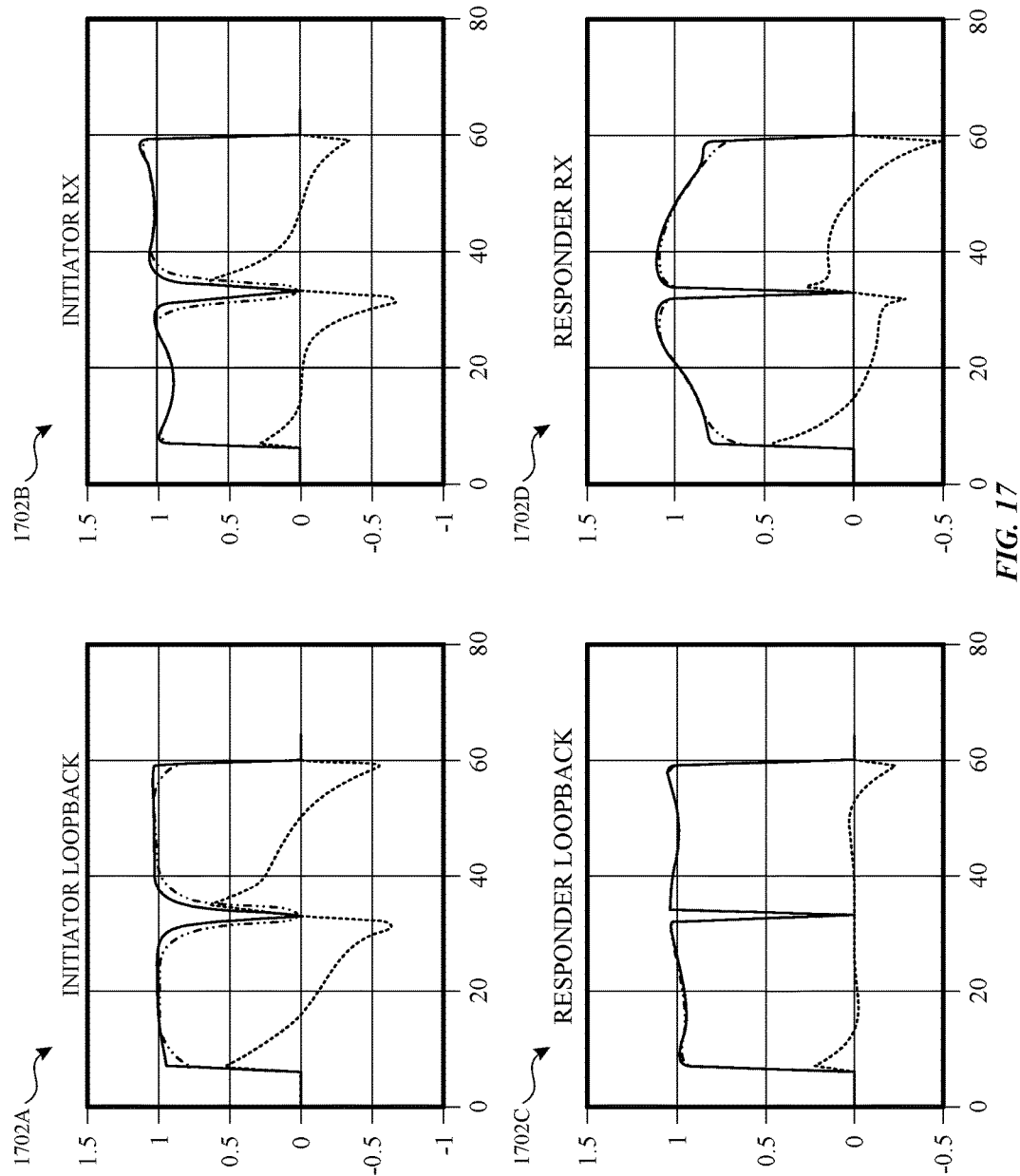
FIG. 17 illustrates graphs of example transmitter and receiver complex distortion in accordance with one or more implementations.

FIG. 17 illustrates graphs 1702A-D of example transmitter and receiver complex distortion in accordance with one or more implementations. The graph 1702A includes the complex distortion that corresponds to the frequency domain matched filter output of the graph 1602A. The graph 1702B includes the complex distortion that corresponds to the frequency domain matched filter output of the graph 1602B. The graph 1702C includes the complex distortion that corresponds to the frequency domain matched filter output of the graph 1602C. The graph 1702D includes the complex distortion that corresponds to the frequency domain matched filter output of the graph 1602D. In one or more implementations, averaging the response over multiple data collects in a multipath-free environment may allow for the characterizing of the transmitter and receiver complex distortion shown in the graphs 1702A-D. In this manner, the complex distortion can be compensated for in the captured samples.

Figure 18:
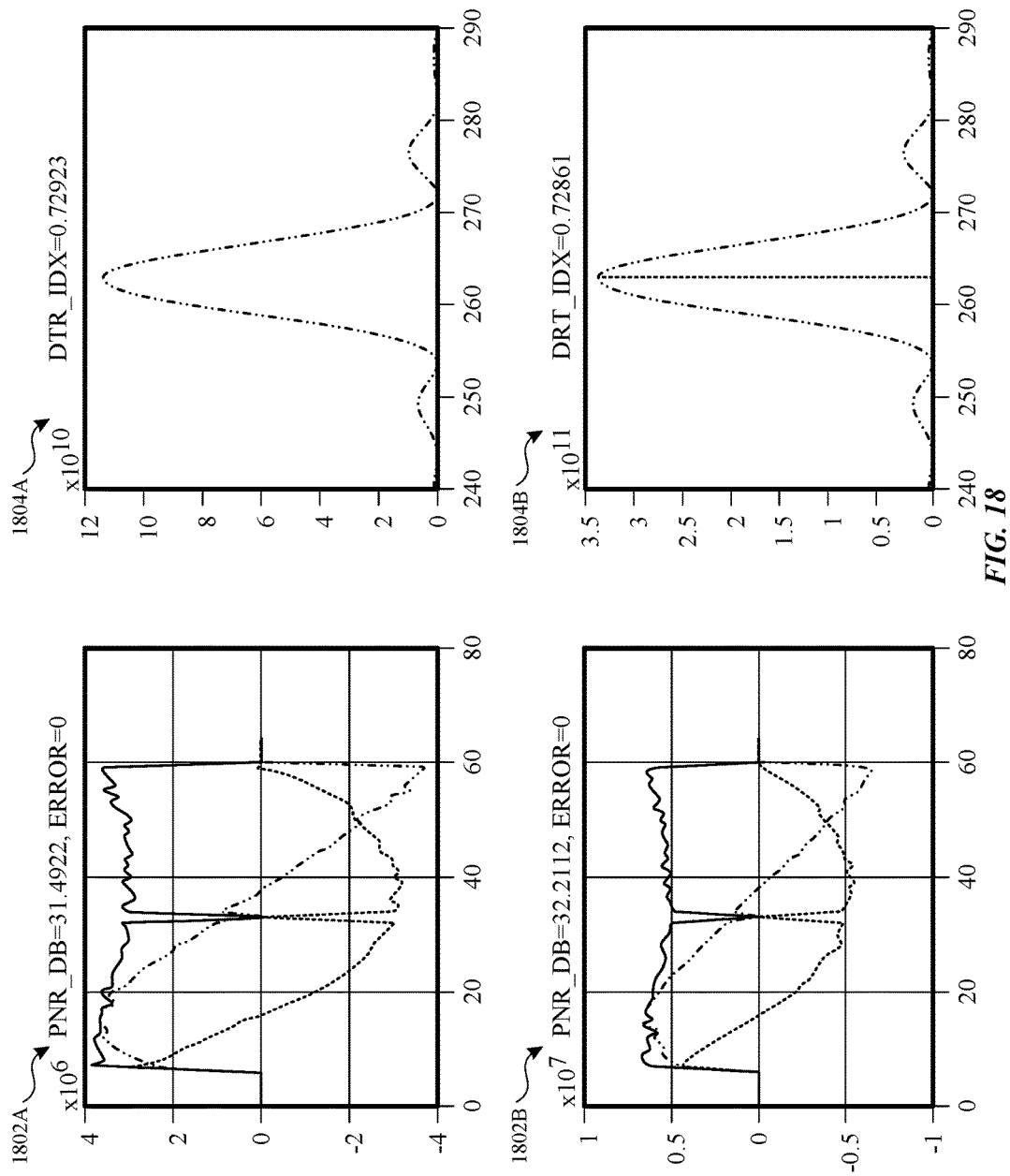
FIG. 18 illustrates graphs of frequencies and phases of example signals exchanged in accordance with one or more implementations.

FIG. 18 illustrates graphs of frequencies 1802A-B and phases 1804A-B of example signals exchanged in accordance with one or more implementations. The graphs 1802A-B show the frequency signals determined for each direction, for example, using the signal exchange described above in FIG. 3. The graphs 1804A-B show that the signals are phase-aligned; also, carrier-phase-level distance changes may be observed.

Figure 19:
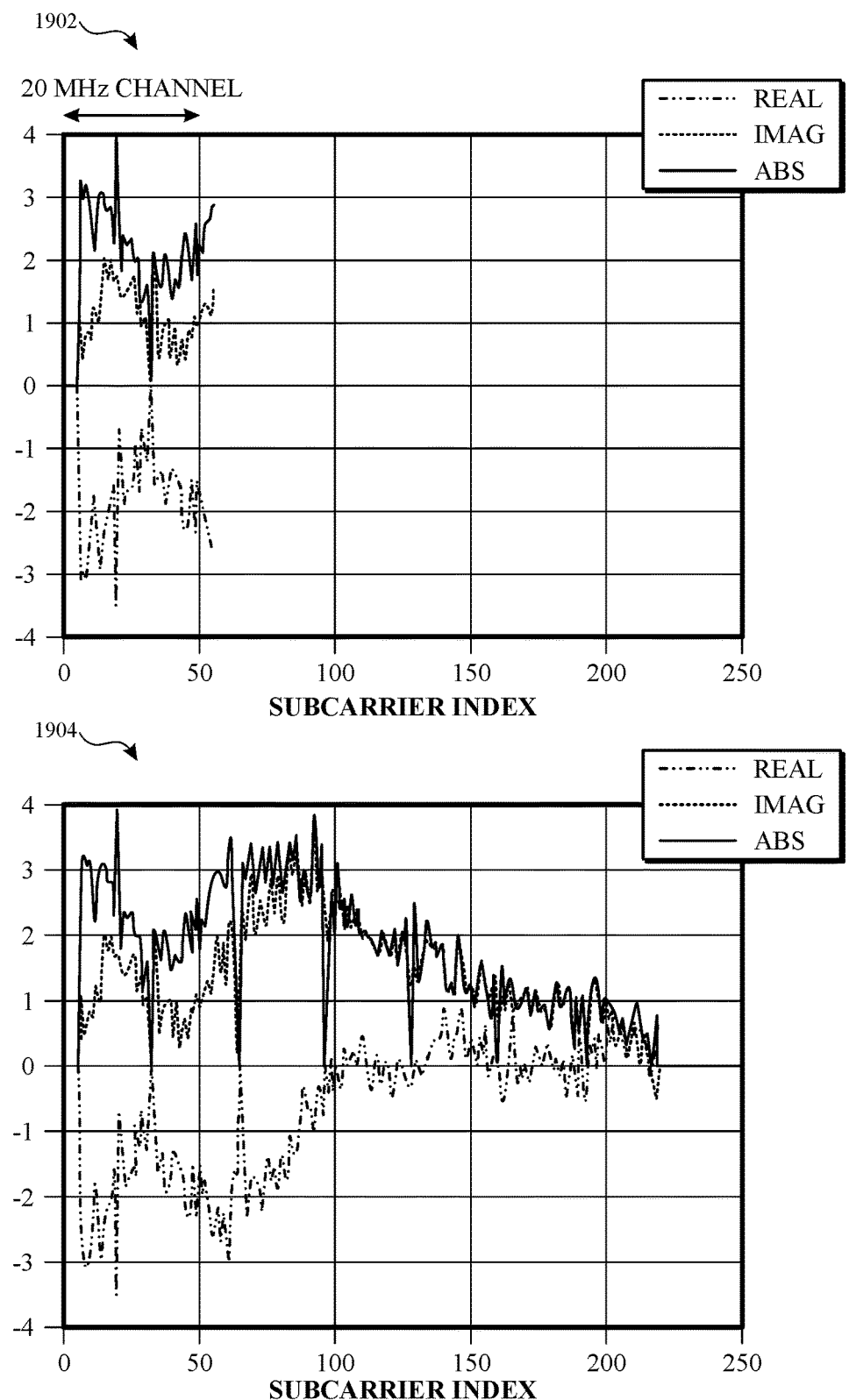
FIG. 19 illustrates graphs of an example single band channel estimate and an example aggregated wideband channel estimate in accordance with one or more implementations.

FIG. 19 illustrates graphs 1902 and 1904 of an example single band channel estimate and an example aggregated wideband channel estimate, respectively, in accordance with one or more implementations. The graph 1902 shows a channel estimate over for a 20 MHz channel. The graph 1904 shows multiple channel estimates aggregated, or stitched, together to form an aggregated wideband channel estimate.

Figure 20:
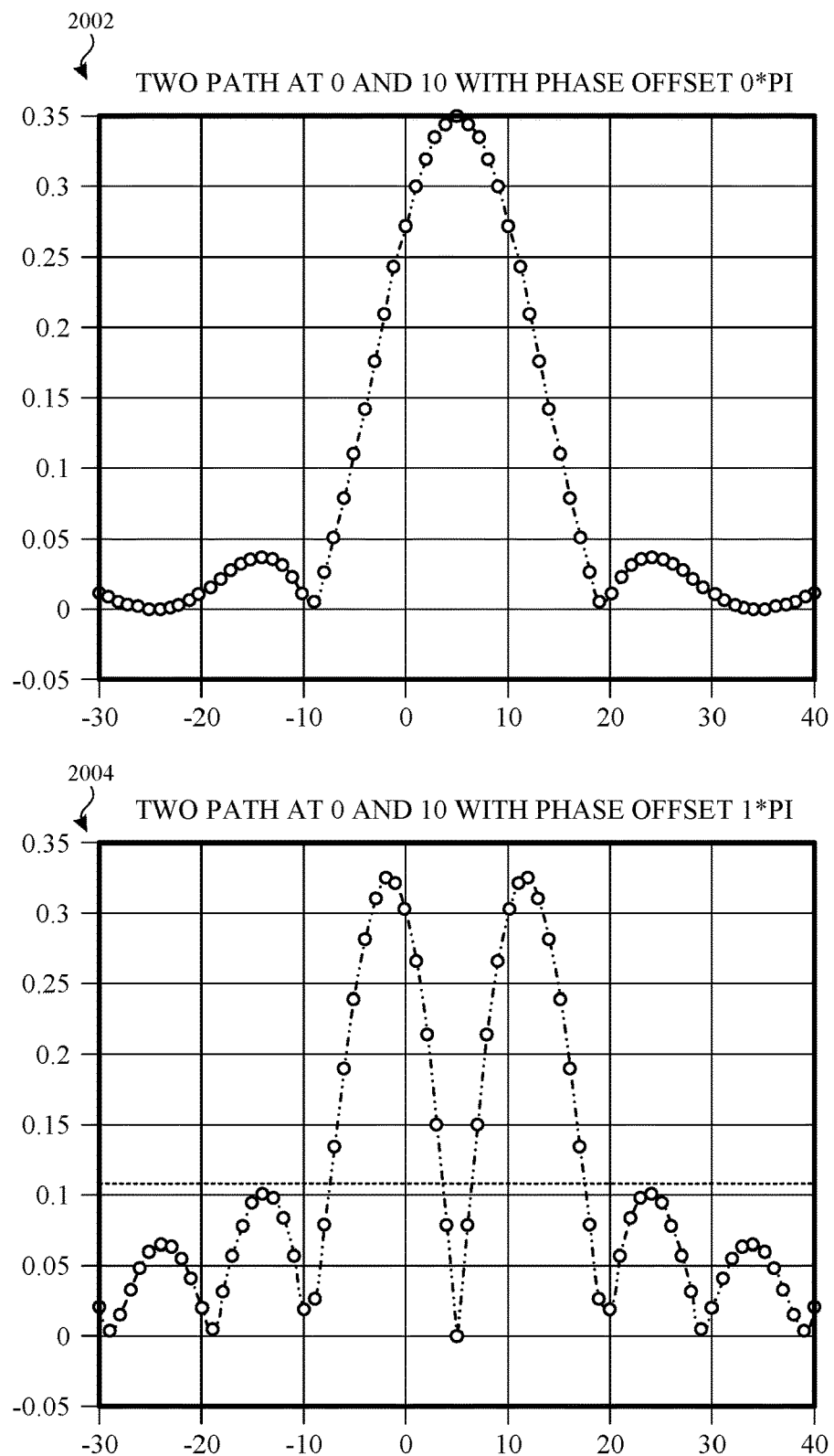
FIG. 20 illustrates graphs of samples of example multipath signals in accordance with one or more implementations.

FIG. 20 illustrates graphs 2002, 2004 of samples of example multipath signals in accordance with one or more implementations. As shown in the graphs 2002, 2004, two equally strong paths exist at samples 0 and 10, which are approximately 9.4 meters apart, but with different phase offsets. When the phase offset is 0, such as in the graph 2002, the two paths have a constructive effect on each other, and the overall time domain correlation looks like a fat path. In this instance, high or low complexity algorithms may function properly with high SNR. However, in low SNR scenarios, sidelobes that are earlier in time may be erroneously considered the first arriving path.

In the graph 2004, the phase offset is rotated to $\pi$, and the two paths have the opposite phase and thus are deconstructive on each other. As a result, the overall picture in the time domain shows two narrow peaks, e.g., two paths that are pushing away from each other. In this instance, the low complexity algorithms may not provide accurate results even in a high SNR scenario if the algorithm did not detect the first peak while relying on the strongest peak.

Figure 21:
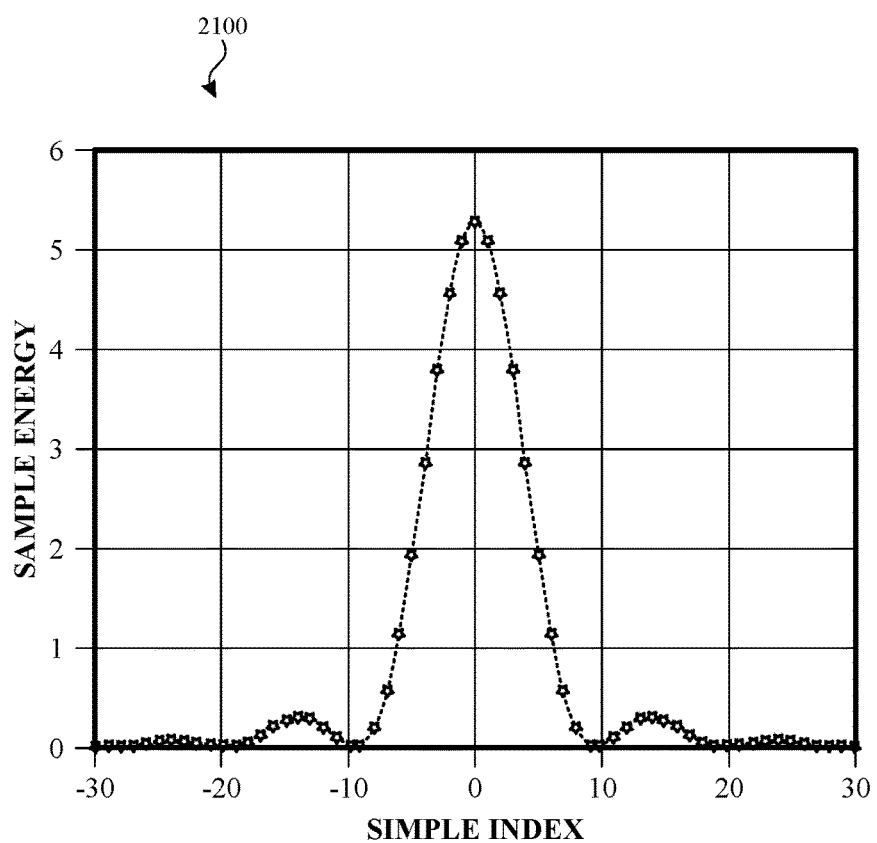
FIG. 21 illustrates a graph of energy levels of samples of an example signal in accordance with one or more implementations.

FIG. 21 illustrates a graph 2100 of energy levels of samples of an example signal in accordance with one or more implementations. The graph 2100 shows the energy of the time domain pulse shape where the frequency response is assumed to be 1 for subcarrier indices (ranging from 1 to 64 with subcarrier 1 as DC) and 0 on all other subcarriers. As shown in the graph 2100, the second sidelobe is located at the sample indices+−14 with an energy 12.37 dB lower than the main peak energy. Also, the second sidelobe is located at sample indices+−24 with an energy 19.04 dB lower than the main peak energy.

Figure 22:
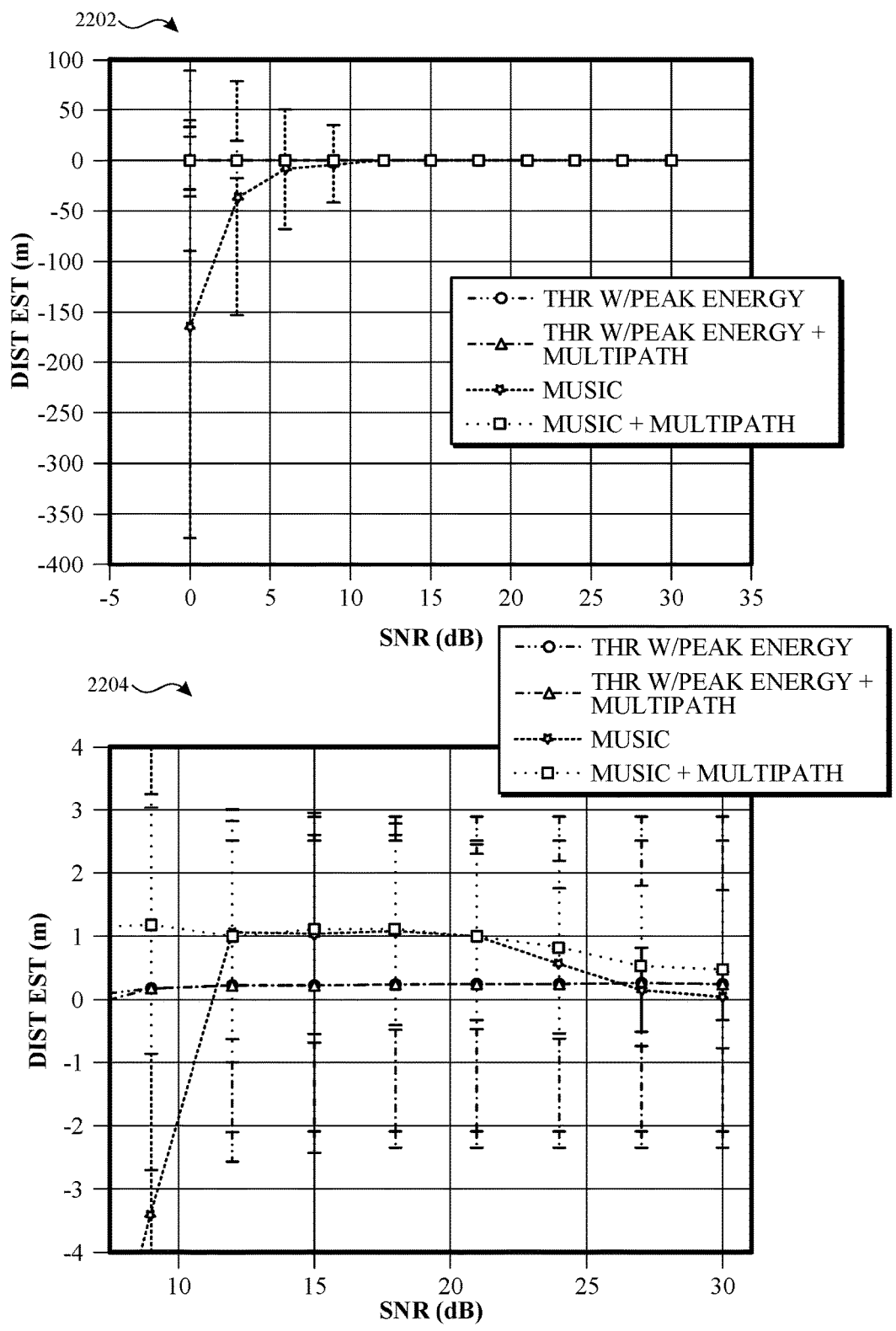
FIG. 22 illustrates graphs of example distance estimations obtained using different time of arrival estimation algorithms in accordance with one or more implementations.

FIG. 22 illustrates graphs 2202, 2204 of example distance estimations obtained using different time of arrival estimation algorithms in accordance with one or more implementations. As shown in the graphs 2202, 2204, when the multipath detection described above in FIG. 5 is utilized in conjunction with the high or low complexity algorithms, the performance of the high and low complexity algorithms is improved.

Figure 23:
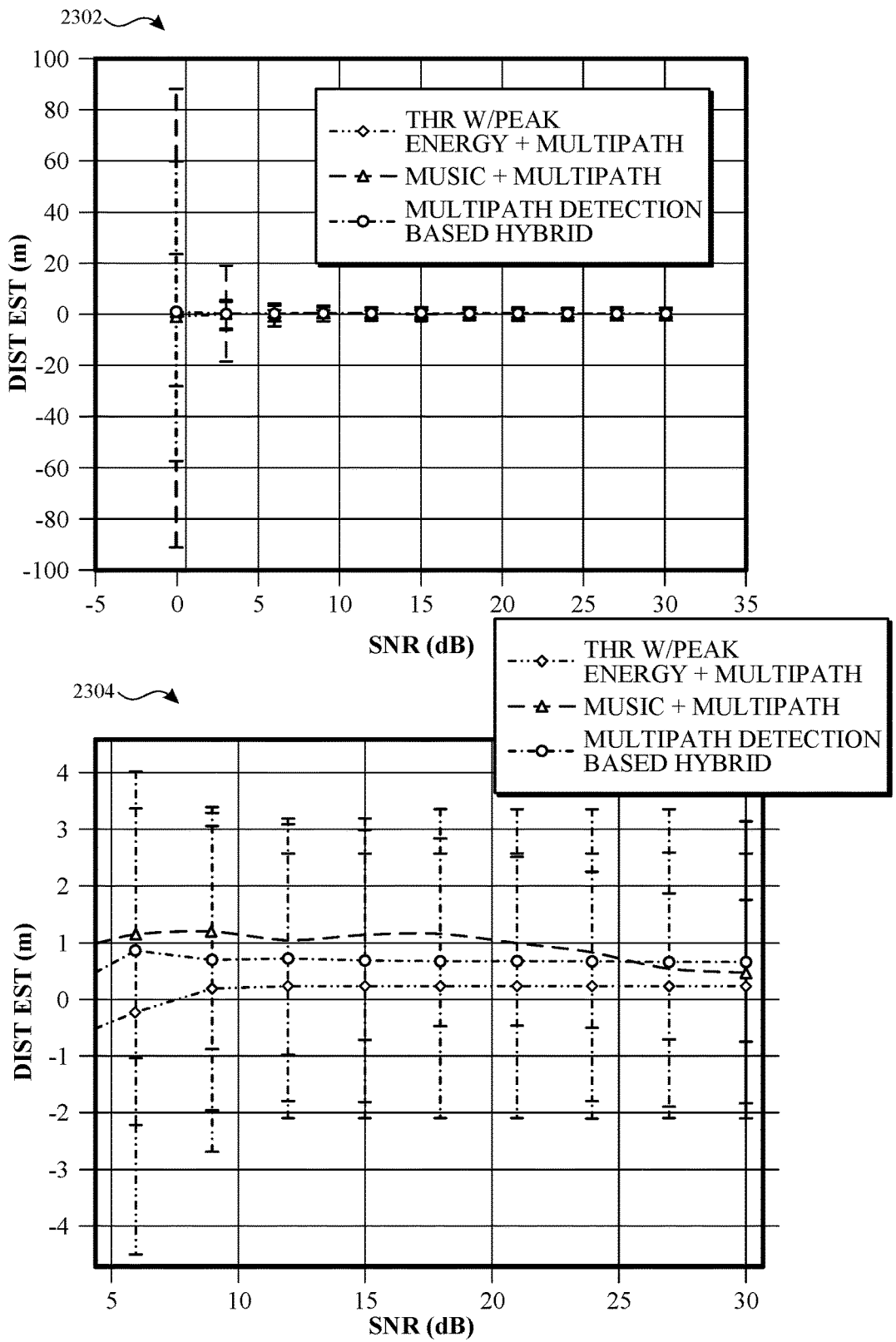
FIG. 23 illustrates graphs of example distance estimations obtained using different time of arrival estimation algorithms in accordance with one or more implementations.

FIG. 23 illustrates graphs 2302, 2304 of example distance estimations obtained using different time of arrival estimation algorithms in accordance with one or more implementations. The graphs 2302, 2304 illustrate the performance when the multipath detection described above in FIG. 5 is utilized to adaptively select a high or low complexity algorithm.

FIG. 24 illustrates example pseudocode for peak detection in accordance with one or more implementations. The pseudocode illustrated in FIG. 24 assumes that LongWindow is the 512-point energy input.

FIG. 25 illustrates example pseudocode for sidelobe rejection in accordance with one or more implementations.

FIG. 26 illustrates example pseudocode for fat-path detection in accordance with one or more implementations. In the pseudocode illustrated in FIG. 26, the bandwidth is read for BW dB lower than the peak energy.

Figure 27:
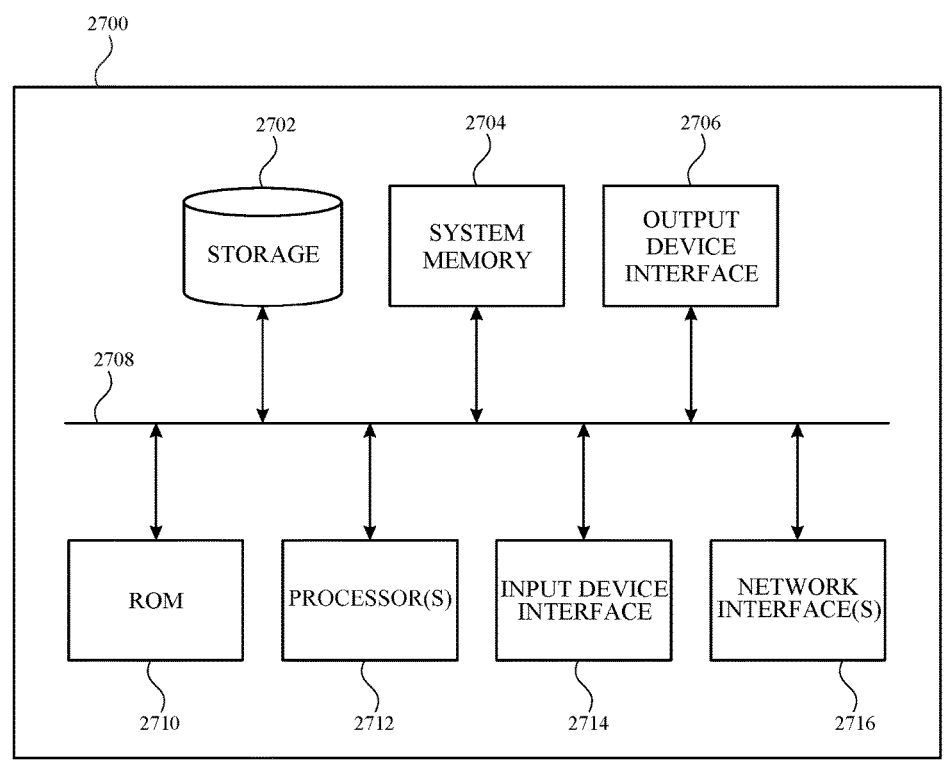
FIG. 27 conceptually illustrates an electronic system with which aspects of the subject technology may be implemented in accordance with one or more implementations.

FIG. 27 conceptually illustrates an electronic system 2700 with which one or more implementations of the subject technology may be implemented. The electronic system 2700 can be, and/or can be a part of, one or more of the electronic devices 102A-E shown in FIG. 1. The electronic system 2700 may include various types of computer readable media and interfaces for various other types of computer readable media. The electronic system 2700 includes a bus 2708, one or more processing unit(s) 2712, a system memory 2704 (and/or buffer), a ROM 2710, a permanent storage device 2702, an input device interface 2714, an output device interface 2706, and one or more network interfaces 2716, or subsets and variations thereof.

The bus 2708 collectively represents all system, peripheral, and chipset buses that communicatively connect the numerous internal devices of the electronic system 2700. In one or more implementations, the bus 2708 communicatively connects the one or more processing unit(s) 2712 with the ROM 2710, the system memory 2704, and the permanent storage device 2702. From these various memory units, the one or more processing unit(s) 2712 retrieves instructions to execute and data to process in order to execute the processes of the subject disclosure. The one or more processing unit(s) 2712 can be a single processor or a multi-core processor in different implementations.

The ROM 2710 stores static data and instructions that are needed by the one or more processing unit(s) 2712 and other modules of the electronic system 2700. The permanent storage device 2702, on the other hand, may be a read-and-write memory device. The permanent storage device 2702 may be a non-volatile memory unit that stores instructions and data even when the electronic system 2700 is off. In one or more implementations, a mass-storage device (such as a magnetic or optical disk and its corresponding disk drive) may be used as the permanent storage device 2702.

In one or more implementations, a removable storage device (such as a floppy disk, flash drive, and its corresponding disk drive) may be used as the permanent storage device 2702. Like the permanent storage device 2702, the system memory 2704 may be a read-and-write memory device. However, unlike the permanent storage device 2702, the system memory 2704 may be a volatile read-and-write memory, such as random access memory. The system memory 2704 may store any of the instructions and data that one or more processing unit(s) 2712 may need at runtime. In one or more implementations, the processes of the subject disclosure are stored in the system memory 2704, the permanent storage device 2702, and/or the ROM 2710. From these various memory units, the one or more processing unit(s) 2712 retrieves instructions to execute and data to process in order to execute the processes of one or more implementations.

The bus 2708 also connects to the input and output device interfaces 2714 and 2706. The input device interface 2714 enables a user to communicate information and select commands to the electronic system 2700. Input devices that may be used with the input device interface 2714 may include, for example, alphanumeric keyboards and pointing devices (also called "cursor control devices"). The output device interface 2706 may enable, for example, the display of images generated by electronic system 2700. Output devices that may be used with the output device interface 2706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 27, the bus 2708 also couples the electronic system 2700 to one or more networks and/or to one or more network nodes through the one or more network interface(s) 2716. In this manner, the electronic system 2700 can be a part of a network of computers (such as a LAN, a wide area network ("WAN"), or an Intranet, or a network of networks, such as the Internet. Any or all components of the electronic system 2700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. A method comprising:
generating, by a first device, a channel estimate for each respective channel of a plurality of channels by:
transmitting a first signal to a second device in the respective channel,
receiving a first loopback signal corresponding to the transmitted first signal and obtaining first loopback signal samples corresponding to the first loopback signal,
receiving a second signal from the second device in the respective channel and obtaining first device received signal samples corresponding to the second received signal,
receiving, from the second device, second device received signal samples obtained from the first signal as received at the second device and second loopback signal samples obtained by the second device from a second loopback signal received by the second device in conjunction with transmitting the second signal,
determining a group delay bias associated with the first and second devices based at least in part on the first device and second device received signal samples and the first and second loopback signal samples, and
generating the channel estimate for the respective channel based at least in part on the first and second device received signal samples, the first and second loopback signal samples, and the group delay bias;
aggregating, by the first device, the channel estimate generated for each respective channel of the plurality of channels into an aggregated channel estimate; and
estimating, by the first device, a time of arrival based at least in part on the aggregated channel estimate.

2. The method of claim 1, wherein generating the channel estimate for the respective channel based at least in part on the first and second device received signal samples, the first and second loopback signal samples, and the group delay bias further comprises:
generating a first channel estimate based at least in part on the first device received signal samples, the second loopback signal samples, and the group delay bias; and
generating a second channel estimate based at least in part on the second device received signal samples, the first loopback signal samples, and the group delay bias.

3. The method of claim 1, wherein the first device received signal samples and the first loopback signal samples are time-aligned with a first sample timer of the first device, and the second device received signal samples and the second loopback signal samples are time-aligned with a second sample timer of the second device.

4. The method of claim 3, wherein the first and second sample timers are not synchronized or the first and second sample timers are periodically reset with a known fixed period.

5. The method of claim 1, wherein the channel estimate for each respective channel of the plurality of channels is further generated by:
computing a discrete Fourier transform of at least one of the first device received signal samples, the second device received signal samples, the first loopback signal samples, or the second loopback signal samples; and
multiplying an output of the discrete Fourier transform by a ranging sequence.

6. The method of claim 1, wherein determining the group delay bias further comprises:
estimating a first time delay by cross-correlating and normalizing the first device received signal samples with the second device received signal samples to obtain a first result;
subtracting a second time delay determined from the first loopback signal samples from a third time delay determined from the second loopback signal samples to obtain a second result; and
adding the first result and the second result to obtain the group delay bias.

7. The method of claim 1, wherein at least one channel of the plurality of channels is associated with a communication protocol different from a communication protocol associated with at least one other channel of the plurality of channels or at least two of the plurality of channels comprise overlapping subcarriers, and when the at least two of the plurality of channels comprise the overlapping subcarriers, aggregating, by the first device, the channel estimate generated for each respective channel of the plurality of channels into the aggregated channel estimate further comprises:
matching, by the first device, phases of the overlapping subcarriers.

8. A computer program product comprising code stored in a non-transitory computer-readable storage medium, the code comprising:
code to generate, by a first device, a channel estimate for each respective channel of a plurality of channels by:
transmitting a first signal to a second device in the respective channel,
receiving a first loopback signal corresponding to the transmitted first signal and obtaining first loopback signal samples corresponding to the first loopback signal,
receiving a second signal from the second device in the respective channel and obtaining first device received signal samples corresponding to the second received signal,
receiving, from the second device, second device received signal samples obtained from the first signal as received at the second device and second loopback signal samples obtained by the second device from a second loopback signal received by the second device in conjunction with transmitting the second signal, and
generating the channel estimate for the respective channel based at least in part on the first and second device received signal samples, and the first and second loopback signal samples;
code to aggregate, by the first device, the channel estimate generated for each respective channel of the plurality of channels into an aggregated channel estimate; and
code to estimate, by the first device, a time of arrival based at least in part on the aggregated channel estimate.

9. The computer program product of claim 8, wherein the first device received signal samples and the first loopback signal samples are time-aligned with a first sample timer of the first device, and the second device received signal samples and the second loopback signal samples are time-aligned with a second sample timer of the second device.

10. The computer program product of claim 9, wherein the first and second sample timers are not synchronized or the first and second sample timers are periodically reset with a known fixed period.

11. The computer program product of claim 8, wherein the channel estimate for each respective channel of the plurality of channels is further generated by:
computing a discrete Fourier transform of at least one of the first device received signal samples, the second device received signal samples, the first loopback signal samples, or the second loopback signal samples; and
multiplying an output of the discrete Fourier transform by a ranging sequence.

12. The computer program product of claim 8, wherein at least one channel of the plurality of channels is associated with a communication protocol different from a communication protocol associated with at least one other channel of the plurality of channels or at least two of the plurality of channels comprise overlapping subcarriers, and when the at least two of the plurality of channels comprise the overlapping subcarriers, the code to aggregate, by the first device, the channel estimate generated for each respective channel of the plurality of channels into the aggregated channel estimate further comprises:
code to match, by the first device, phases of the overlapping subcarriers.

13. A first device comprising:
a memory; and
at least one processor configured to:
generate a channel estimate for each respective channel of a plurality of channels by:
transmitting a first signal to a second device in the respective channel,
receiving a second signal from the second device in the respective channel and obtaining first device received signal samples corresponding to the second received signal,
receiving, from the second device, second device received signal samples obtained from the first signal as received at the second device,
determining a group delay bias associated with the first and second devices based at least in part on the first device and second device received signal samples, and
generating the channel estimate for the respective channel based at least in part on the first and second device received signal samples and the group delay bias;
aggregate the channel estimate generated for each respective channel of the plurality of channels into an aggregated channel estimate; and
estimate a time of arrival based at least in part on the aggregated channel estimate.

14. The first device of claim 13, wherein the at least one processor is further configured to generate the channel estimate for each respective channel of the plurality of channels by:
receiving a first loopback signal corresponding to the transmitted first signal and obtaining first loopback signal samples corresponding to the first loopback signal, and
receiving second loopback signal samples obtained by the second device from a second loopback signal received by the second device in conjunction with transmitting the second signal.

15. The first device of claim 14, wherein the channel estimate for the respective channel is generated based at least in part on the first and second device received signal samples, the first and second loopback signal samples, and the group delay bias.

16. The first device of claim 15, wherein the at least one processor is further configured to generate the channel estimate for the respective channel based at least in part on the first and second device received signal samples, the first and second loopback signal samples, and the group delay bias by:
generating a first channel estimate based at least in part on the first device received signal samples, the second loopback signal samples, and the group delay bias; and
generating a second channel estimate based at least in part on the second device received signal samples, the first loopback signal samples, and the group delay bias.

17. The first device of claim 15, wherein the at least one processor is further configured to determine the group delay bias by:
estimating a first time delay by cross-correlating and normalizing the first device received signal samples with the second device received signal samples to obtain a first result;
subtracting a second time delay determined from the first loopback signal samples from a third time delay determined from the second loopback signal samples to obtain a second result; and
adding the first result and the second result to obtain the group delay bias.

18. The first device of claim 14, wherein the first device received signal samples and the first loopback signal samples are time-aligned with a first sample timer of the first device, and the second device received signal samples and the second loopback signal samples are time-aligned with a second sample timer of the second device.

19. The first device of claim 18, wherein the first and second sample timers are not synchronized or the first and second sample timers are periodically reset with a known fixed period.

20. The first device of claim 14, wherein the at least one processor is further configured to generate the channel estimate for each respective channel of the plurality of channels by further comprising:
computing a discrete Fourier transform of at least one of the first device received signal samples, the second device received signal samples, the first loopback signal samples, or the second loopback signal samples; and
multiplying an output of the discrete Fourier transform by a ranging sequence.

* * * * *